(12) United States Patent
Kuo

(10) Patent No.: US 11,945,913 B2
(45) Date of Patent: Apr. 2, 2024

(54) THERMOSETTING POLYIMIDE RESIN AND MANUFACTURING METHOD THEREOF, COMPOSITION, PREPOLYMER, FILM, ADHESIVE, AND USE THEREOF

(71) Applicant: CHIN YEE CHEMICAL INDUSTRIES CO., LTD., Taipei (TW)

(72) Inventor: Pi-Tao Kuo, Taipei (TW)

(73) Assignee: CHIN YEE CHEMICAL INDUSTRIES CO., LTD., Taipei (TW)

( * ) Notice: Subject to any disclaimer, the term of this patent is extended or adjusted under 35 U.S.C. 154(b) by 548 days.

(21) Appl. No.: 16/924,228

(22) Filed: Jul. 9, 2020

(65) Prior Publication Data

US 2021/0261733 A1 Aug. 26, 2021

(30) Foreign Application Priority Data

May 11, 2020 (TW) ................. 109115513

(51) Int. Cl.
| | |
|---|---|
| *C08G 73/10* | (2006.01) |
| *C08G 73/12* | (2006.01) |
| *C08J 5/18* | (2006.01) |
| *C09J 179/08* | (2006.01) |

(52) U.S. Cl.
CPC ..... *C08G 73/1082* (2013.01); *C08G 73/1014* (2013.01); *C08G 73/1039* (2013.01); *C08G 73/1053* (2013.01); *C08G 73/124* (2013.01); *C08J 5/18* (2013.01); *C09J 179/08* (2013.01); *C08J 2379/08* (2013.01)

(58) Field of Classification Search
None
See application file for complete search history.

(56) References Cited

U.S. PATENT DOCUMENTS

| | | |
|---|---|---|
| H424 H | 2/1988 | Martin et al. |
| 7,157,587 B2 | 1/2007 | Mizori et al. |
| 2022/0204766 A1 * | 6/2022 | Mizori ................... C08G 73/12 |

FOREIGN PATENT DOCUMENTS

| | | | |
|---|---|---|---|
| JP | 2015193628 A | * 11/2015 | |
| JP | 2018168370 A | * 11/2018 | ............. B32B 15/08 |
| JP | 2018168371 | 11/2018 | |
| KR | 20130004160 A | * 1/2013 | |
| TW | 201433591 | 9/2014 | |

\* cited by examiner

*Primary Examiner* — Rachel Kahn
(74) *Attorney, Agent, or Firm* — JCIPRNET

(57) ABSTRACT

The disclosure provides a thermosetting polyimide resin and a manufacturing method thereof, a composition, a prepolymer, a film, an adhesive, and a use thereof. The composition includes at least: (a) a maleimide compound and (b) the thermosetting polyimide resin. The disclosure provides the thermosetting polyimide resin and the prepolymer, for manufacturing a film, an adhesive sheet, a cover film, a redistribution layer, a build-up board, a prepreg sheet, a high-frequency substrate, an integrated circuits carrier board, an adhesive for copper foil, a semiconductor packaging material, a radome, a substrate for server, a substrate for base station, a substrate for vehicle, etc.

9 Claims, No Drawings

THERMOSETTING POLYIMIDE RESIN AND MANUFACTURING METHOD THEREOF, COMPOSITION, PREPOLYMER, FILM, ADHESIVE, AND USE THEREOF

CROSS-REFERENCE TO RELATED APPLICATION

This application claims the priority benefit of Taiwan application serial no. 109115513, filed on May 11, 2020. The entirety of the above-mentioned patent application is hereby incorporated by reference herein and made a part of this specification.

BACKGROUND

Technical Field

The disclosure provides a thermosetting polyimide resin and a manufacturing method thereof, a composition, and a prepolymer. The composition includes at least: (a) a maleimide compound and (b) the thermosetting polyimide resin. The disclosure provides the thermosetting polyimide resin and the prepolymer thereof, for manufacturing a film, an adhesive sheet, a cover film, a redistribution layer, a build-up board, a prepreg sheet, a high-frequency substrate, an integrated circuits (IC) carrier board, an adhesive for copper foil, a semiconductor packaging material, a radome, a substrate for server, a substrate for base station, a substrate for vehicle, etc.

Description of Related Art

In 2019, mobile communications began to enter the first year of commercialization of 5G (1-6 GHz/24-29.5 GHz), which is also the first year of technological innovation of 6G (30 GHz-300 GHz), indicating that the high frequency has entered the terahertz (THz) era from the gigahertz (GHz) era, the wavelength has entered the millimeter wave (wavelength of 1-10 mm/30-300 GHz) communication technology from the microwave communication technology, and the communication technology will develop toward high transmission speed and low transmission loss. Polymers used as insulation materials must have characteristics such as low dielectric constant (Dk), low dissipation factor (DO, etc. The insulation materials with low Dk and low Df are applied to the fields of high-frequency substrate, semiconductor packaging, flexible printed circuit board, antenna, radar, internet of things (IoT) electronic product, etc. However, the signal transmission speed has a negative correlation with Dk, and the signal transmission loss has a positive correlation with Dk and Df. For the insulation materials under an applied electric field of 1-22 GHz, Dk gradually decreases and Df gradually increases with increasing frequency; under an applied electric field of 22-300 GHz, Dk and Df simultaneously decrease with increasing frequency. In addition, the commercial frequency of 5G communication is 1-6 GHz/24-29.5 GHz, so in 5G communication, the Df value (1-6 GHz) of the insulation materials becomes more important. Polyphenylene oxide (PPO) resin, liquid crystal polymer (LCP) resin, and polytetrafluoroethylene (PTFE) in the insulation materials have been used in the field of high-frequency substrate. However, traditional polyimide has issues such as high water absorption, higher Dk and Df, poor processability, etc., so there is still room for improvement for polyimide used as the insulation materials of 5G communication.

Patent Document 1 (TW 201433591A) discloses a polyimide resin. A dehydration reaction is performed on biphenyl dianhydride and dimer diamine with a carbon number of 36 (abbreviated as "C36") in a xylene and dimethyl acetamide solvent to synthesize a solvent-soluble polyimide resin. A biphenol novolac epoxy resin is used as a curing agent. A cured product is used as a flexible substrate semiconductor packaging material with Df (1 GHz) of above 0.0031.

Patent Document 2 (JP 2018-168371A) discloses a polyimide and a manufacturing method thereof. Aromatic anhydride and C36 dimer diamine are used to synthesize a solvent-soluble polyimide resin. A tetrafunctional epoxy resin is used as a cross-linking agent. A cured product is used as an adhesive layer of a flexible distribution board with Df (10 GHz) of above 0.0026.

Patent Document 3 (US H424) discloses a manufacturing method of a bismaleimide resin of C36 dimer diamine. N,N'-dicyclohexylcarbodiimide and 1-hydroxybenzotriazole are used to synthesize bismaleimide of C36 dimer diamine. Patent Document 3 provides a method, for synthesizing bismaleimide polydiamine through a mild method with a yield of 38-56%.

Patent Document 4 (U.S. Pat. No. 7,157,587B2) uses an appropriate dianhydride and dimer diamine to perform a reflux condensation in a toluene solvent using triethylamine and methanesulfonic acid as catalysts to obtain an amine-terminated oligomer, which is then reacted with an excess of maleic anhydride to obtain a liquid bismaleimide monomer by purification using precipitation and filtration.

Patent Documents 1 and 2 use polyimide of C36 dimer diamine and the glass transition temperature (dynamic mechanical analysis (DMA) method) after curing with a curing agent is about below 50° C.; the manufacturing method of the bismaleimide resin of C36 dimer diamine of Patent Document 3 has a low yield and the glass transition temperature (DMA method) after curing is about below 65° C.; and the liquid bismaleimide monomer of Patent Document 4 may easily have residual triethylamine and methanesulfonic acid catalysts, which affect the water absorption and dielectric property of the cured product and cannot be widely applied to the fields of film material and substrate material of 5G communication. Therefore, how to improve the processability of the resin, reduce Df, and increase the glass transition temperature while maintaining the solvent solubility and low water absorption rate is an important topic that the industry looks forward to solving.

SUMMARY

The disclosure aims to solve the issues of the prior arts such as low glass transition temperature (Tg), high water absorption rate, etc. of polyimide and bismaleimide, which cannot simultaneously have high Tg and low dielectric property. The neglected issues are that there are still rooms for improvement in the solvent resistance, film formation, and processing convenience, so polyimide and bismaleimide cannot be widely applied to the fields of substrate material, film material, etc.

In view of the above, since the dielectric constant (Dk) is related to the movement of molecular segments under an applied electric field; the dissipation factor (DO is related to the polarity of water molecules and the residual amount of small molecules; Tg is related to the molecular rigid segments and cross-link density; the water absorption is related to the residual catalyst, trace of polar solvent, and self-water absorption of polar functional group; the solubility and molecular stackability are related to the intermolecular force, the technical measures to solve the issues are as follows. First, a fluorene-containing segment and a long fat segment are introduced to reduce the dielectric property and improve the solvent solubility. Second, the substitution of maleic anhydride with allylsuccinic anhydride having better thermal stability is more suitable for addition to a polyimide molecule terminal at high temperature, so that the polyimide molecule is self-cross-linkable to prevent the terminal segment of the polyimide molecule from moving under an electric field, thereby reducing the dielectric property and solvent resistance after curing while increasing Tg. Third, Tg of polyimide is increased using a fluorene-containing rigid side group. The dielectric property of polyimide in the glass state may be reduced as the movement of molecular segments is frozen. Fourth, any unreacted residual acid and polar solvent in a product is removed using a washing process, thereby reducing Df of polyimide. Fifth, Tg of a cured product is increased by co-curing using thermosetting polyimide and fluorine-containing maleimide. On the other hand, the introduction of fluorine reduces the dielectric property of the cured product.

The disclosure provides a thermosetting polyimide resin, with a chemical structure thereof shown in Formula (1):

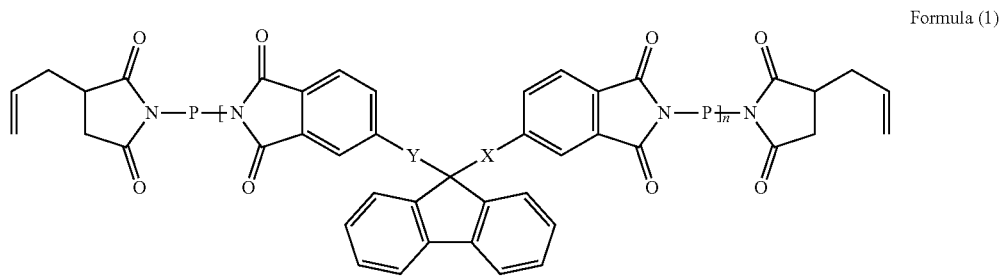

Formula (1)

where P is a divalent hydrocarbon group with a carbon number of 36 (abbreviated as "C36") having an aliphatic side chain;

X and Y are

or a single bond;

R1 and R2 are H, F, or CH$_3$;

R3 is

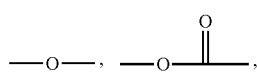

or

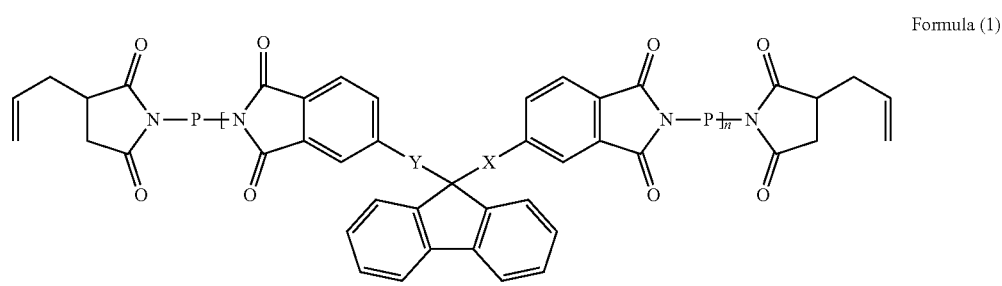

and n is an integer from 1 to 5000.

The disclosure provides a polyimide film, including the thermosetting polyimide resin as a constituent element thereof.

The disclosure provides a polyimide adhesive, including the thermosetting polyimide resin as a constituent element thereof.

The disclosure provides a manufacturing method of a thermosetting polyimide resin, wherein a chemical structure of the thermosetting polyimide resin is shown in Formula (1):

Formula (1)

where P is a C36 divalent hydrocarbon group having an aliphatic side chain;

X and Y are

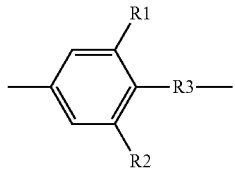

or a single bond;

R1 and R2 are H, F, or CH₃;

R3 is

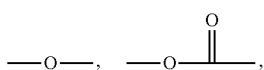

or

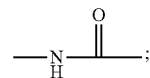

and n is an integer from 1 to 5000;

the manufacturing method of the thermosetting polyimide resin including:

a procedure A of performing a dehydration reaction on C36 dimer diamine and fluorene dianhydride in a mixed solvent of a polar solvent and a low-polarity solvent to obtain a first solution containing an amine-terminated polyimide resin;

a procedure B of adding allylsuccinic anhydride to the first solution to perform a dehydration reaction on the allylsuccinic anhydride and the amine-terminated polyimide resin to obtain a second solution containing an allyl-terminated polyimide resin; and a procedure C of removing any unreacted material, water-soluble substance, and water from the second solution to obtain the allyl-terminated polyimide resin.

The disclosure provides a thermosetting polyimide resin composition, including at least:

(a) a fluorine-containing maleimide compound, selected from at least one of a group composed of

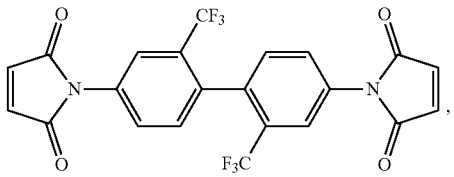

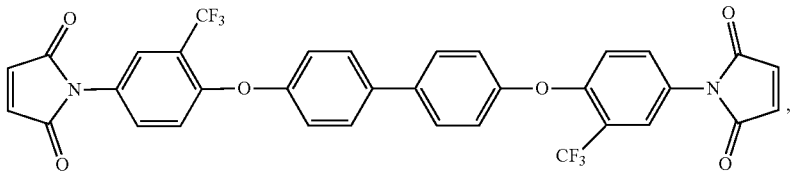

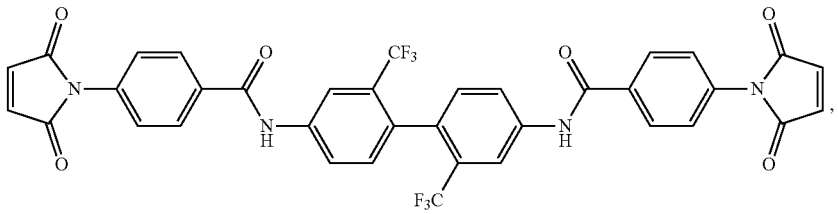

and

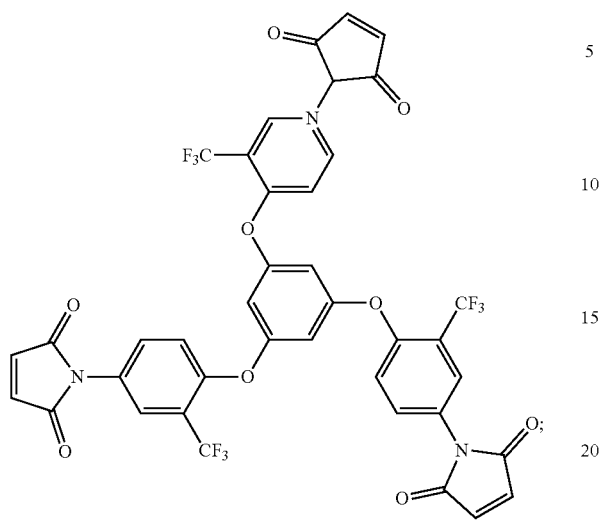

and
(b) a thermosetting polyimide resin, with a chemical structure thereof shown in Formula (1):

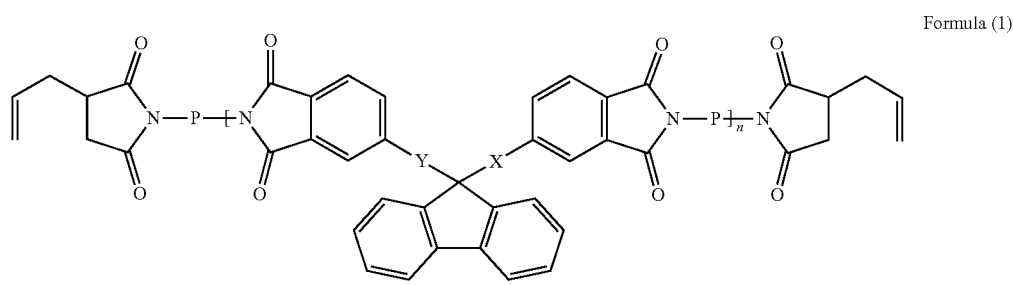

Formula (1)

where P is a C36 divalent hydrocarbon group having an aliphatic side chain;
X and Y are

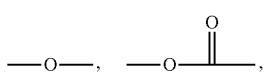

or a single bond;
R1 and R2 are H, F, or CH$_3$;
R3 is

—O—, —O—C(=O)—, or

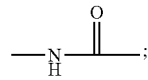

and
n is an integer from 1 to 5000.

The disclosure provides a polyimide adhesive, including the thermosetting polyimide resin composition as a constituent element thereof.

The disclosure provides a thermosetting polyimide prepolymer, obtained by performing a prepolymerization reaction on (a) a fluorine-containing maleimide compound and (b) a thermosetting polyimide resin, wherein
(a) the fluorine-containing maleimide compound is selected from at least one of a group composed of

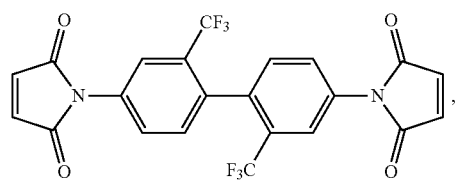
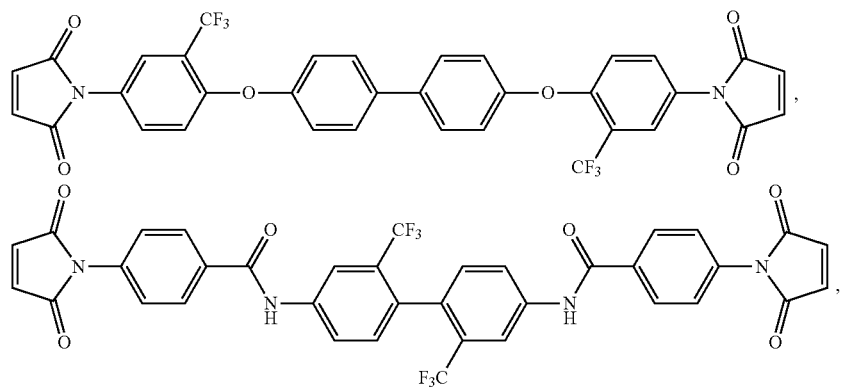
and
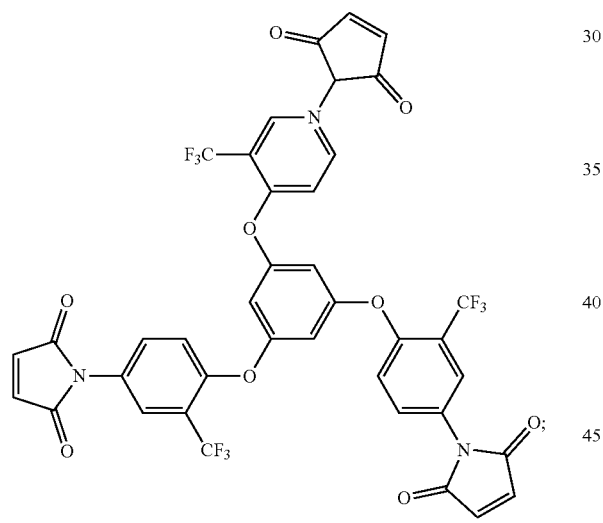
and
(b) a chemical structure of the thermosetting polyimide resin is shown in Formula (1):
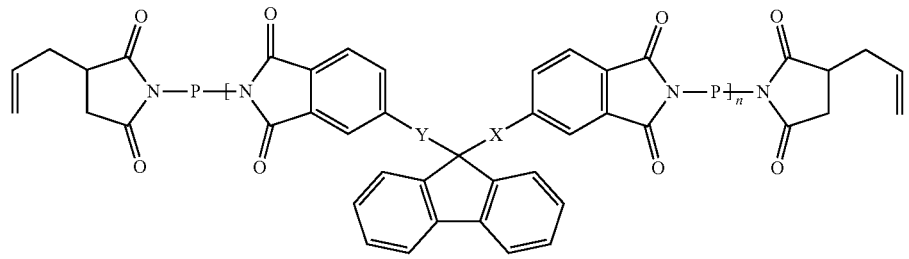
Formula (1)

where P is a C36 divalent hydrocarbon group having an aliphatic side chain;

X and Y are

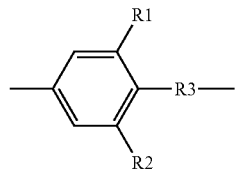

or a single bond;

R1 and R2 are H, F, or CH$_3$;

R3 is

or

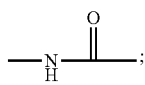

and n is an integer from 1 to 5000.

The disclosure provides a polyimide film, including the thermosetting polyimide prepolymer as a constituent element thereof.

The disclosure provides a polyimide adhesive, including the thermosetting polyimide prepolymer as a constituent element thereof.

The disclosure provides a polyimide adhesive, for manufacturing a film, an adhesive sheet, a cover film, a redistribution layer, a build-up board, a prepreg sheet, a high-frequency substrate, an integrated circuits (IC) carrier board, an adhesive for copper foil, a semiconductor packaging material, a radome, a substrate for server, a substrate for base station, or a substrate for vehicle.

The disclosure provides a thermosetting polyimide adhesive resin, for manufacturing a prepreg sheet, a high-frequency substrate, an IC carrier board, a build-up board, an adhesive for copper foil, a semiconductor packaging material, a radome, a substrate for server, a substrate for base station, a substrate for vehicle, etc.

In the polyimide resin of Patent Document 1, a dehydration reaction is performed on biphenyl dianhydride and C36 dimer diamine in a xylene and dimethyl acetamide solvent to synthesize a solvent-soluble polyimide resin. A biphenol novolac epoxy resin is used as a curing agent. The molecular terminal group thereof is polar anhydride. A polar hydroxyl (—OH) group is produced after curing with the epoxy resin curing agent. The water absorption and Df thereof are increased. The rigid segment in the molecular main chain is biphenyl. Although increasing the rigid segment of biphenyl in the main chain can increase Tg, the solvent solubility will be reduced. In contrast, the thermosetting polyimide resin of the disclosure does not use any catalyst to perform an imidization reaction in a solvent, a self-cross-linkable allyl group is added to the molecular terminal, and the water-absorbing polar OH group is not produced after curing. Also, the introduction of cyclic fluorene side chain in the molecule can increase Tg and increase the solvent solubility. A high-toughness ring structure may be formed after co-curing with the fluorine-containing bismaleimide compound, which can increase Tg to above 200° C. and improve the dielectric property and water absorption, thereby meeting the requirements of the next-generation of high-speed and high-frequency substrate, semiconductor packaging material, etc. and the expectations of the industry.

DETAILED DESCRIPTION OF DISCLOSED EMBODIMENTS

In the disclosure, "C36" indicates that the carbon number is 36.

An embodiment of the disclosure provides a thermosetting polyimide resin, with a chemical structure thereof shown in Formula (1):

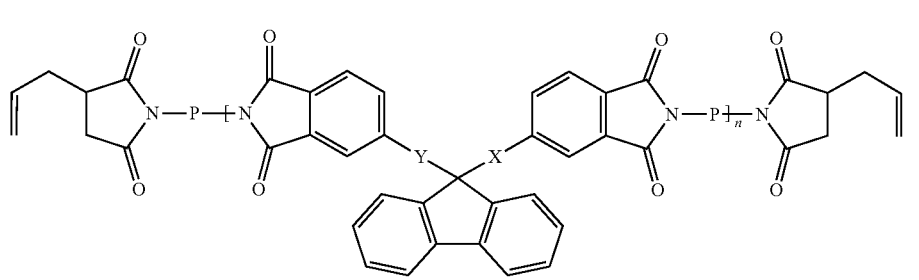

Formula (1)

where P is a C36 divalent hydrocarbon group having an aliphatic side chain;

X and Y are

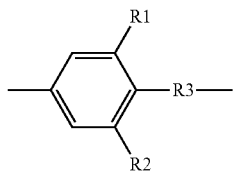

or a single bond;

R1 and R2 are H, F, or CH₃;

R3 is

or

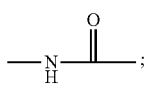

and n is an integer from 1 to 5000.

In an embodiment, the thermosetting polyimide resin is obtained by reacting C36 divalent hydrocarbon diamine having an aliphatic side chain, fluorene dianhydride, and ene-containing monoanhydride.

A C36 fat segment in a thermosetting polyimide resin molecule can increase the solvent solubility and reduce the dielectric property, wherein C36 divalent hydrocarbon diamine having an aliphatic side chain is obtained after reductive amination of dimer containing unsaturated C18 fatty acid.

In an embodiment, C36 divalent hydrocarbon diamine having an aliphatic side chain includes:

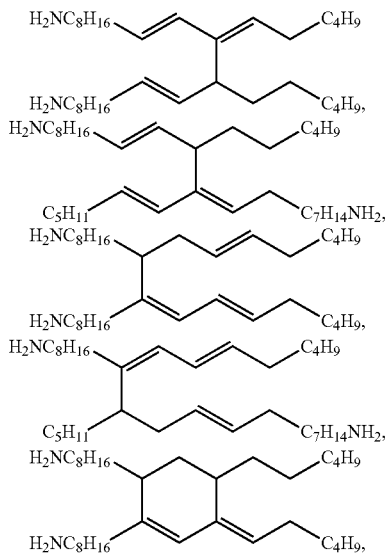

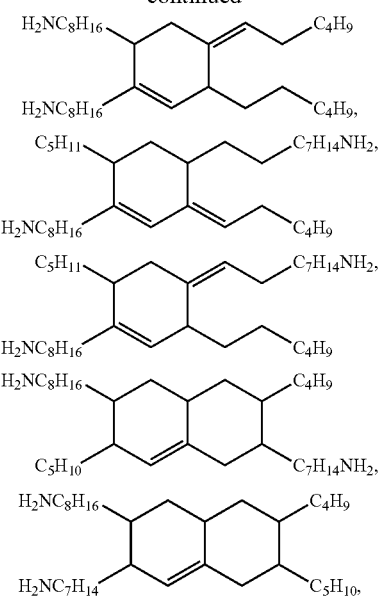

or a combination of the above compounds.

In an embodiment, fluorene dianhydride includes:

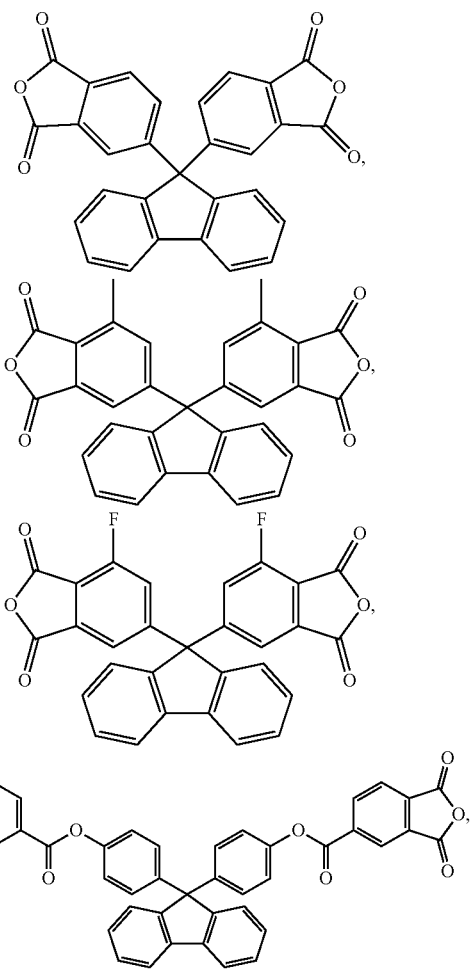

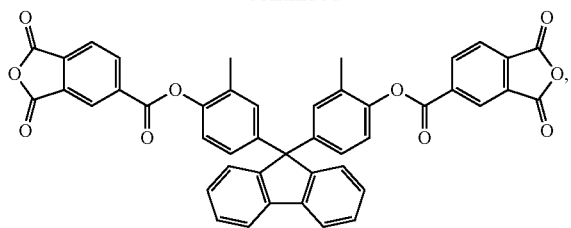
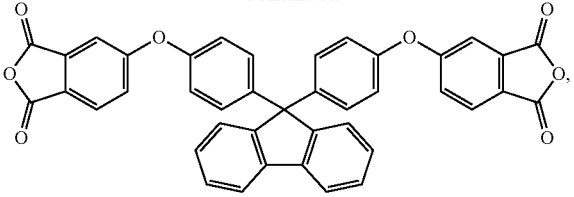
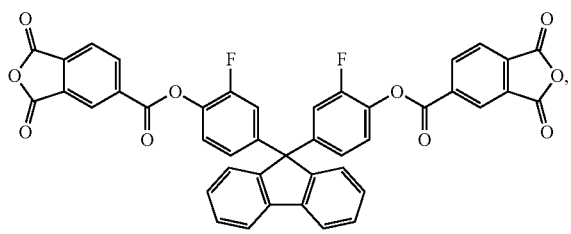
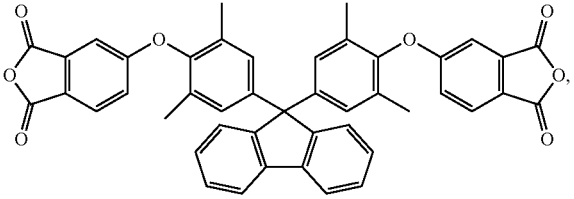
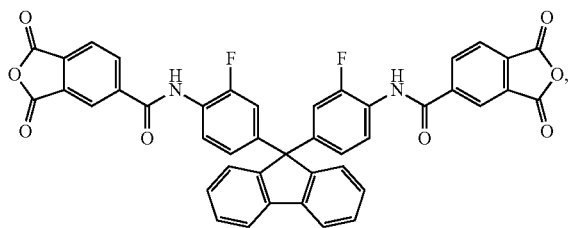
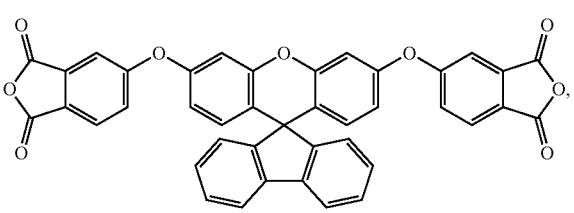 [SMILES: O=C1OC(=O)c2cc(Oc3ccc4c(c3)Oc3cc(Oc5ccc6c(c5)C(=O)OC6=O)ccc3C43c4ccccc4-c4ccccc43)ccc21]
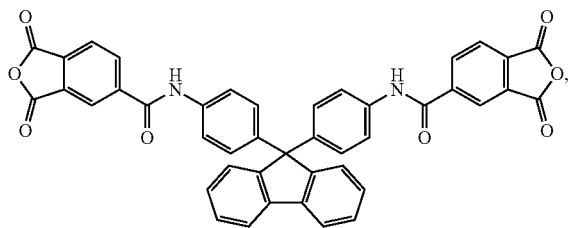
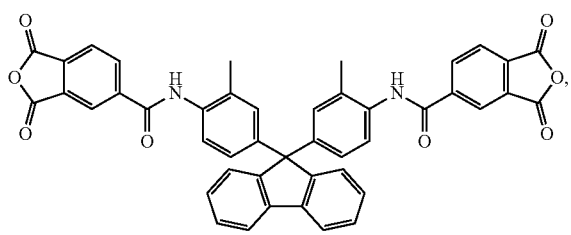
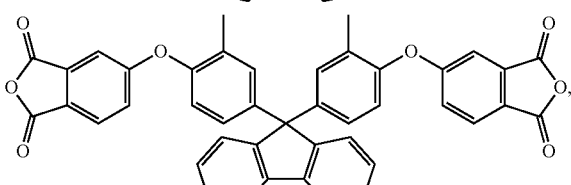
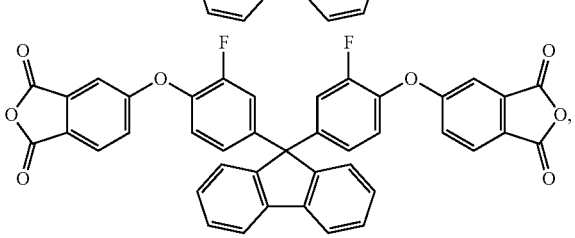

or a combination of the above compounds.

In an embodiment, ene-containing monoanhydride is allylsuccinic anhydride. Generally speaking, ene-containing monoanhydride is, for example, maleic anhydride, citraconic anhydride, itaconic anhydride, allylsuccinic anhydride, 2-hexenyl succinic anhydride, 2-octyl succinic anhydride, nonenyl succinic anhydride, 2-methyl 2-propenylsuccinic anhydride, N-decenyl succinic anhydride, 2,7-octadienyl succinic anhydride, pentadecenyl succinic anhydride, isoctadecenyl succinic anhydride, dodecenyl succinic anhydride, wherein allylsuccinic anhydride has better stability than maleic anhydride, citraconic anhydride, and itaconic anhydride, and is less susceptible to self-polymerization during a high-temperature imidization process, so there will be less oligomer produced during the imidization process. On the other hand, allylsuccinic anhydride is easily soluble in water, which facilitates the subsequent purification process and indirectly improves the dielectric property of the cured product.

Yet another embodiment of the disclosure provides a thermosetting polyimide resin, obtained by reacting C36 divalent hydrocarbon diamine having an aliphatic side chain, fluorene dianhydride, and ene-containing monoanhydride. The ratio of the mole number of C36 divalent hydrocarbon diamine having an aliphatic side chain, the mole number of fluorene dianhydride, and the mole number of ene-containing monoanhydride is 1.00:0.99-0.50:0.002-1.00.

Another embodiment of the disclosure provides a manufacturing method of a thermosetting polyimide resin, with a chemical structure thereof shown in Formula (1):

Formula (1)

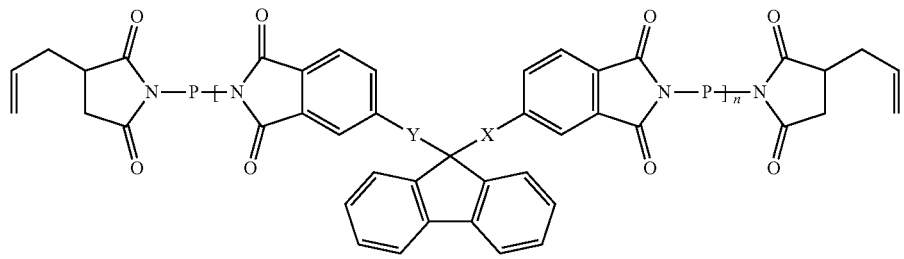

where P is a C36 divalent hydrocarbon group having an aliphatic side chain;
X and Y are

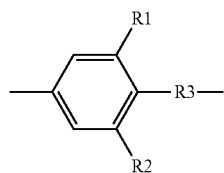

or a single bond;
R1 and R2 are H, F, or CH$_3$;
R3 is

or

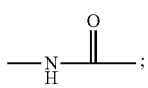

and
n is an integer from 1 to 5000;
the manufacturing method of the thermosetting polyimide resin including:
a procedure A of performing a dehydration reaction on C36 dimer diamine (equivalent to the "C36 divalent hydrocarbon diamine having an aliphatic side chain" above) and fluorene dianhydride in a mixed solvent of a polar solvent and a low-polarity solvent to obtain a first solution containing an amine-terminated polyimide resin;
a procedure B of adding allylsuccinic anhydride to the first solution to perform a dehydration reaction on the allylsuccinic anhydride and the amine-terminated polyimide resin to obtain a second solution containing an allyl-terminated polyimide resin; and a procedure C of removing any unreacted material, water-soluble substance, and water from the second solution to obtain the allyl-terminated polyimide resin.
In an embodiment, the procedure A is to perform a dehydration amidation reaction on C36 dimer diamine and fluorene dianhydride in the mixed solvent of the polar solvent and the low-polarity solvent without adding a catalyst and at 30° C.-180° C. to obtain the first solution containing the amine-terminated polyimide resin. The low-polarity solvent includes: toluene, xylene, trimethylbenzene, methylcyclohexane, cyclohexane, or a combination thereof. The polar solvent includes: methyl isopropyl ketone, methyl isopropyl ketone, cyclohexanone, diisobutyl ketone, methyl isobutyl ketone, 1,1,3-trimethylcyclohexenone, 2,6-dimethyl-2,5-heptadien-4-one, 2-pentanone, 3-methyl-2-pentanone, 2-methyl-3-pentanone, 3-pentanone, 4-methyl-3-pentene-2-one, N-methyl-2-pyrrolidone, dimethylformamide, dimethylacetamide, or a combination thereof.

In an embodiment, the procedure B is to add allylsuccinic anhydride to the first solution, so that the dehydration reaction is performed on the allylsuccinic anhydride and the amine-terminated polyimide resin to obtain the second solution containing the allyl-terminated polyimide resin, wherein the dehydration reaction is to perform the dehydration amidation reaction in the mixed solvent of the polar solvent and the low-polarity solvent at 30° C.-180° C. to obtain the second solution containing the allyl-terminated polyimide resin.

In an embodiment, the procedure C includes: a procedure C1 of washing the second solution containing the allyl-terminated polyimide resin with water, separating a water layer after standing, and removing any unreacted material and water-soluble substance; and a procedure C2 of adding the low-polarity solvent and removing water in the second solution by heating reflux to obtain the allyl-terminated polyimide resin.

In another embodiment, the C1 procedure is, for example, washing the second solution containing the allyl-terminated polyimide resin with low-ion content water, such as pure water, deionized water, distilled water, etc. at 30° C.-80° C., separating and discarding the water layer after stirring for 30 minutes and standing, and repeatedly washing for three to six times to remove any unreacted material and water-soluble polar solvent to obtain the allyl-terminated polyimide resin. In this way, any residual water molecule and small polar molecule in the allyl-terminated polyimide resin after curing can be prevented from affecting the dielectric loss of the cured product. In addition, the C2 procedure, for example, adds toluene, methylcyclohexane, cyclohexane, or other solvents having a boiling point of 100° C.-130° C. to be heated up to 90° C.-130° C. under reflux to azeotropically remove water in the second solution to obtain the allyl-terminated polyimide resin.

Specifically, in an embodiment, the reaction of the thermosetting polyimide resin is as follows:

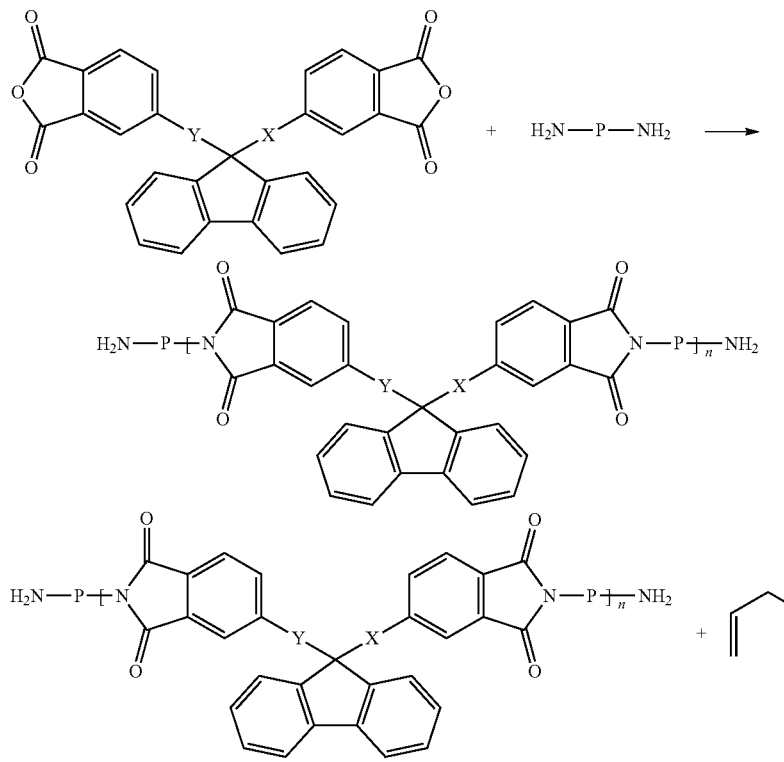
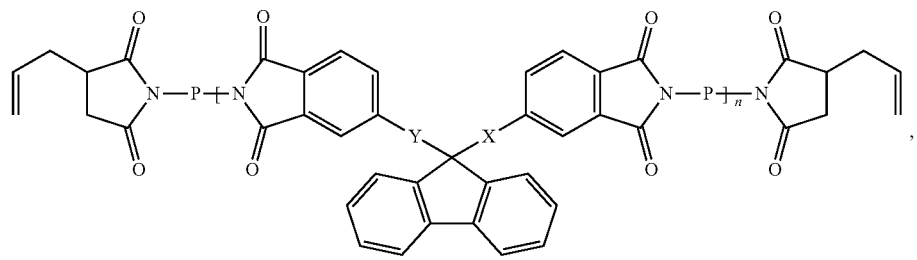
where P is a C36 divalent hydrocarbon group having an aliphatic side chain;
X and Y are
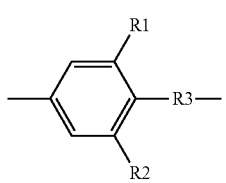
or a single bond;
R1 and R2 are H, F, or CH$_3$;
R3 is
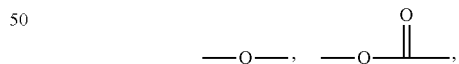
or
and
n is an integer from 1 to 5000.
Another embodiment of the disclosure provides a thermosetting polyimide resin composition, including at least:
(a) a fluorine-containing maleimide compound, selected from at least one of a group composed of

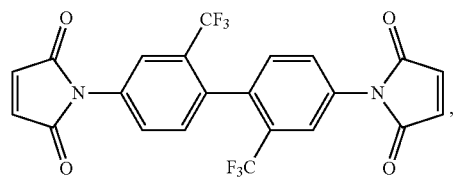
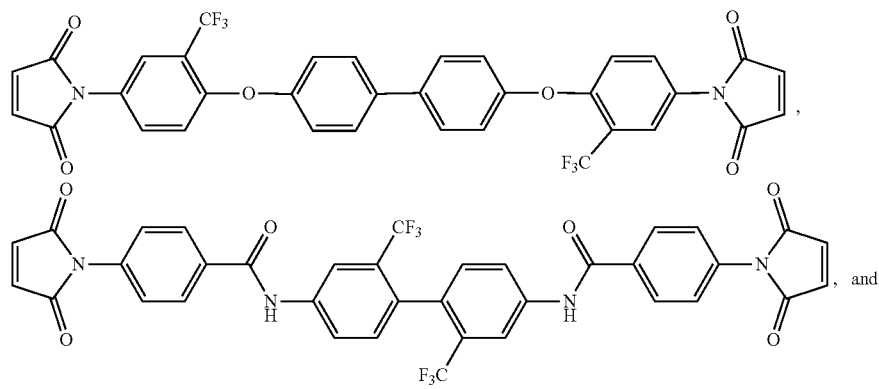
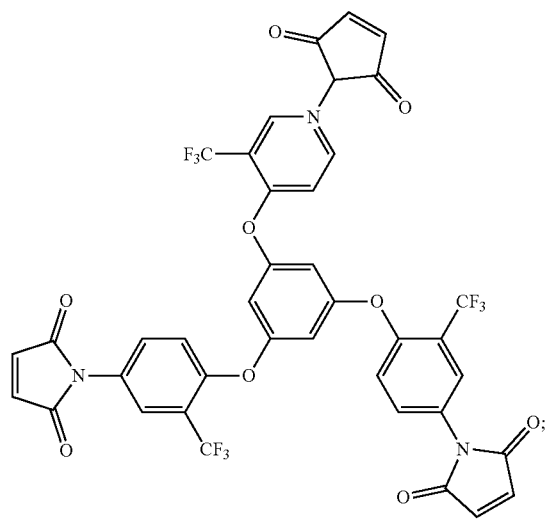
and
(b) a thermosetting polyimide resin, with a chemical structure thereof shown in Formula (1):
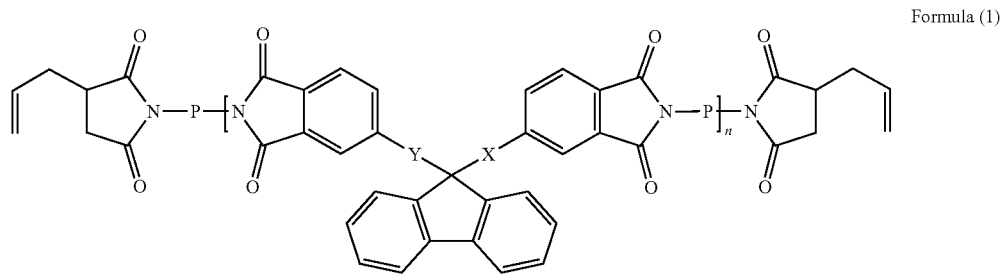
Formula (1)

where P is a C36 divalent hydrocarbon group having an aliphatic side chain;
X and Y are

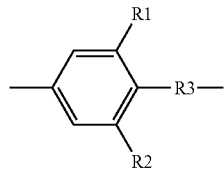

or a single bond;
R1 and R2 are H, F, or CH$_3$;
R3 is

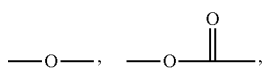

or

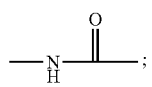

and
n is an integer from 1 to 5000.

Another embodiment of the disclosure provides a thermosetting polyimide resin composition, including at least: (a) a fluorine-containing maleimide compound and (b) a thermosetting polyimide resin, wherein the thermosetting polyimide resin is an allyl polyimide resin, which can be chain-extended with the fluorine-containing maleimide compound using "ene reaction", and then reacted with the fluorine-containing maleimide compound to form a high-toughness ring structure to achieve a cross-linking effect, thereby greatly improving heat resistance and Tg. The cyclization reaction of the allyl polyimide resin and the fluorine-containing maleimide compound is shown below:

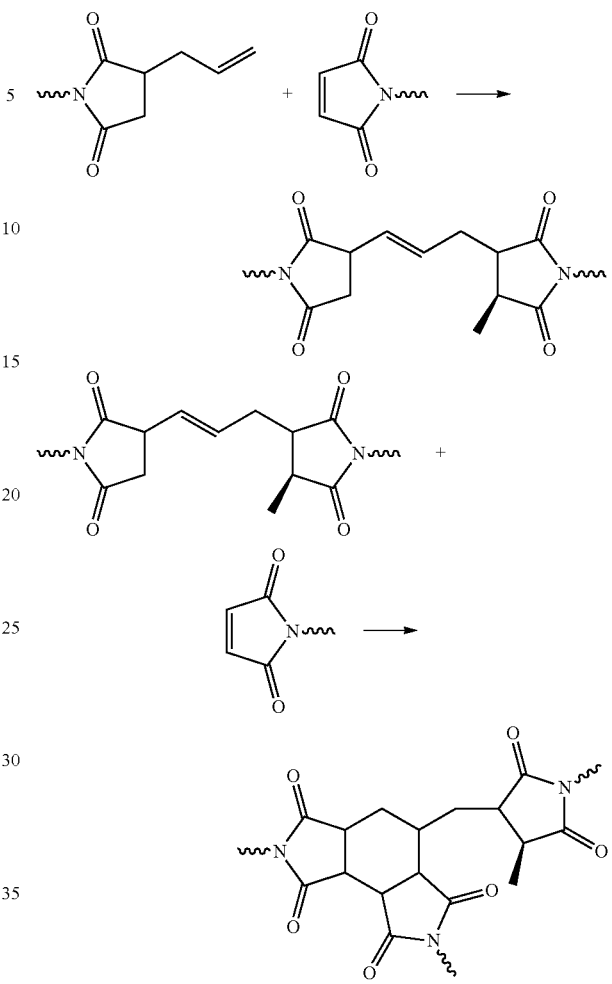

In an embodiment, (a) the fluorine-containing maleimide compound may include:

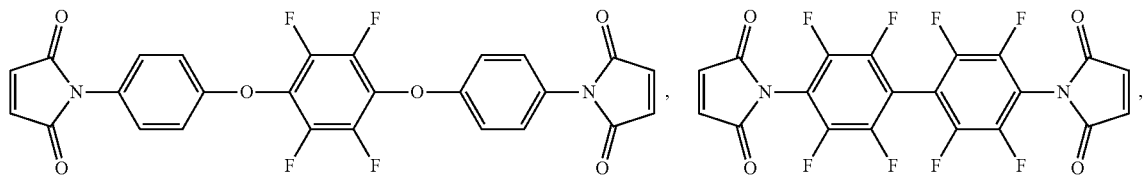

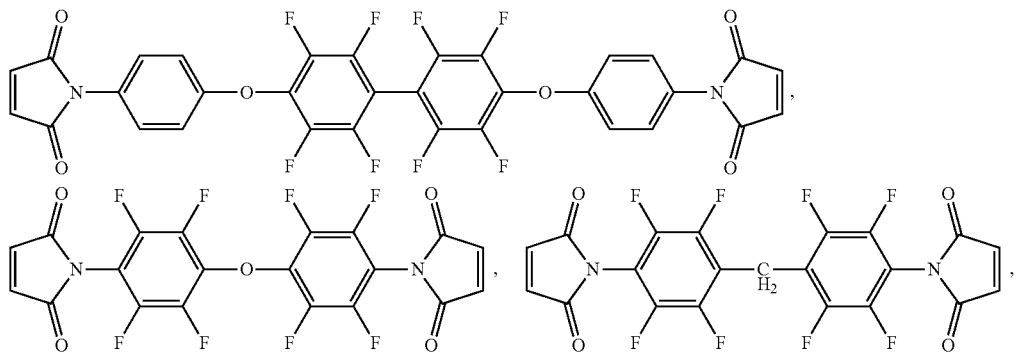

-continued
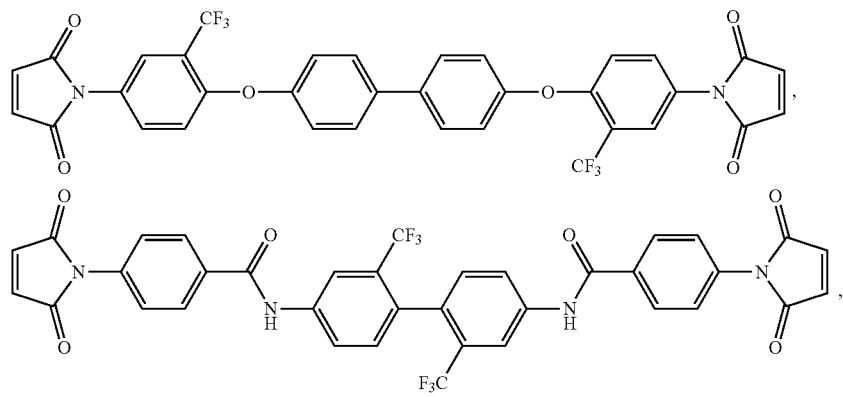
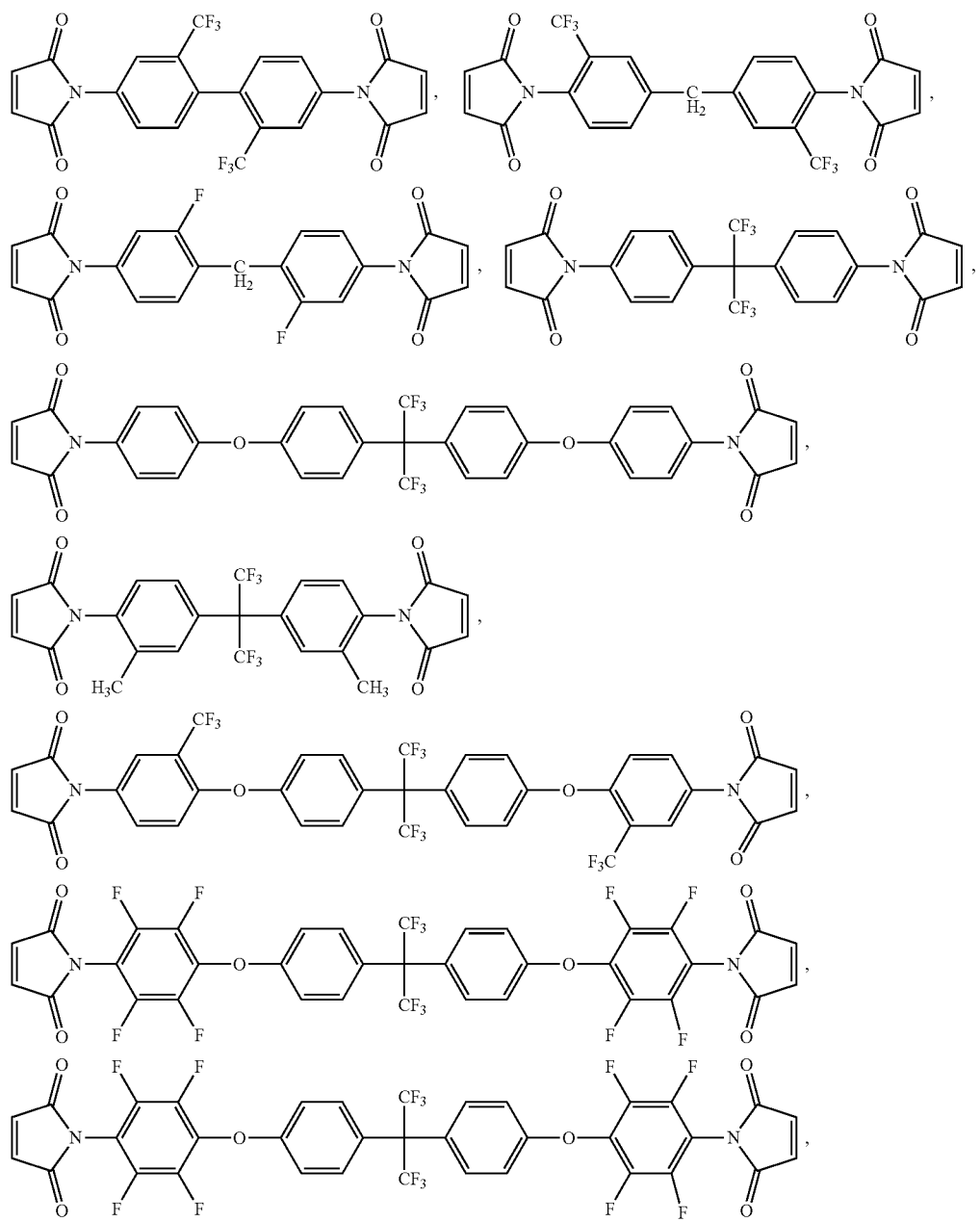

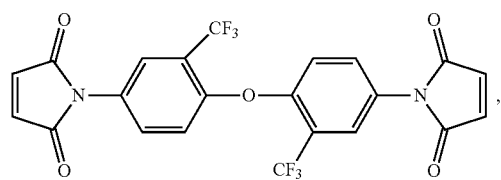 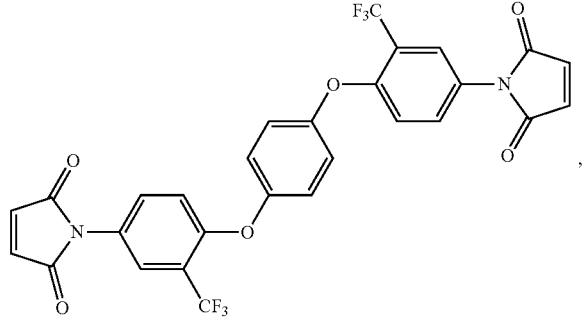

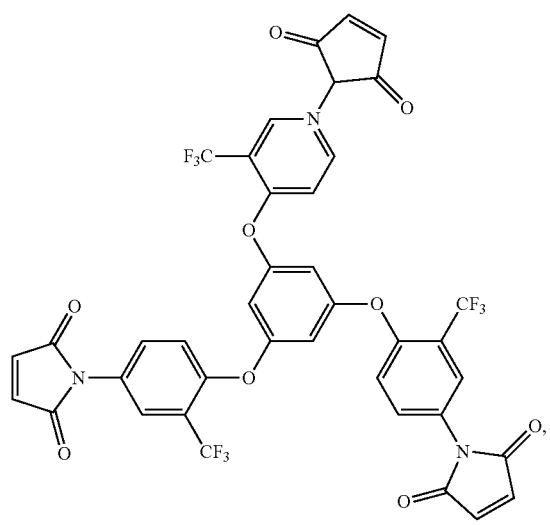 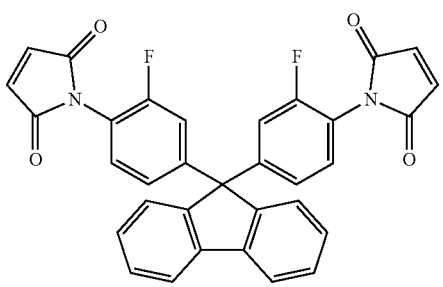

or a combination of the above compounds. It is worth noting that fluorine-containing maleimide generally has a larger volume of fluorine atoms, so Tg is increased less after co-curing with the thermosetting polyimide resin. However, Tg of a fluorine-containing bismaleimide and a fluorine-containing trimaleimide containing diphenyl structures is increased more significantly after co-curing with the thermosetting polyimide resin.

Another embodiment of the disclosure provides a thermosetting polyimide resin and a thermosetting polyimide resin composition, which can be cured with or without a thermal polymerization initiator. The thermal polymerization initiators includes: azobisisobutyronitrile, azobis(2-isopropyl)butyronitrile, azobisisoheptanonitrile, dibenzoyl peroxide, acetonitrile peroxide, peroxide diethyl oxyhydroxide, peroxide(2,4-dichlorobenzoyl amide), peroxide(2-dimethyl benzoyl amide), dodecyl peroxide, diisopropyl dicarbonate, bis-peroxide(3,5,5-trimethylhexyl amide), cyclohexanone peroxide, methyl ethyl ketone peroxide, dicyclohexyl propyl peroxide dicarbonate, dicyclohexyl peroxide dicarbonate, bis(tert-butylcyclohexyl) peroxydicarbonate, bis(2-ethylhexyl)peroxydicarbonate, bis(2-phenylethoxy) peroxydicarbonate, dihexadecyl peroxydicarbonate, tert-butyl peroxybenzoate, tert-butyl peroxyacetate, peroxyacetic acid, tert-butyl peroxypivalate, tert-hexyl pervalerate, cumene peroxy neodecanoate, tert-butyl peroxybenzoate, tert-butyl hydroperoxide, tert-butyl peroxybenzoate, tert-butyl peroxypivalate, cumene hydroperoxide, p-montane hydrogen peroxide, diperoxide tert-butyl, dicumyl peroxide, di-tert-butyl peroxide, or a combination of the above compounds.

An embodiment of the disclosure provides a thermosetting polyimide prepolymer, obtained by performing a prepolymerization reaction on a thermosetting polyimide resin composition.

Another embodiment of the disclosure provides a thermosetting polyimide prepolymer, obtained by performing a prepolymerization reaction on (a) a fluorine-containing maleimide compound and (b) a thermosetting polyimide resin, wherein
(a) the fluorine-containing maleimide compound is selected from at least one of a group composed of

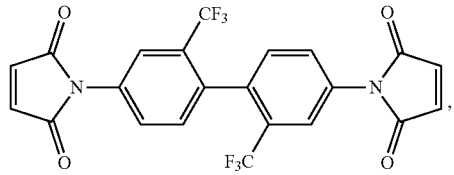

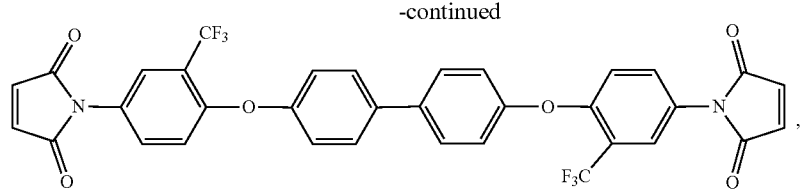
,
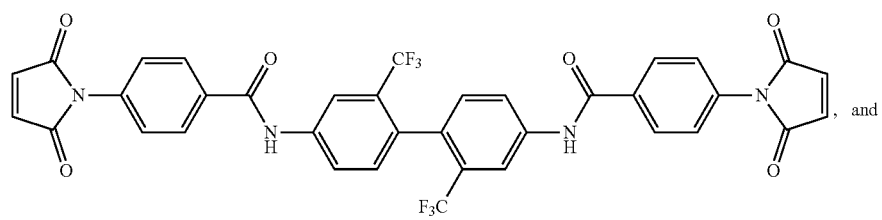
, and
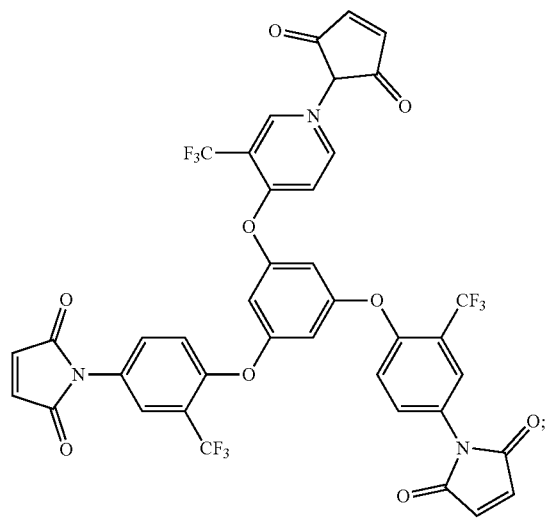
;
and
(b) a chemical structure of the thermosetting polyimide resin is shown in Formula (1):
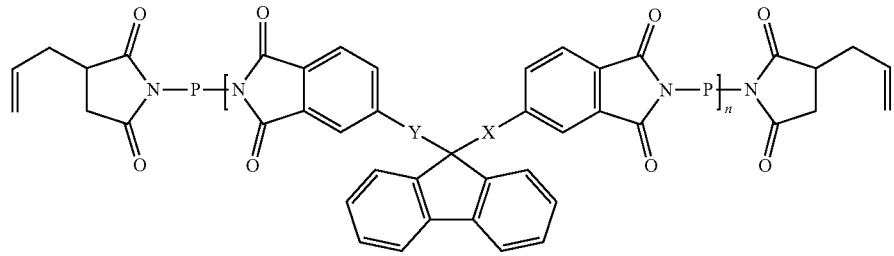
Formula (1)

where P is a C36 divalent hydrocarbon group having an aliphatic side chain;
X and Y are

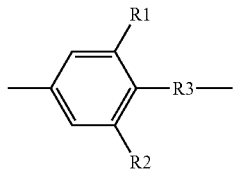

or a single bond;
R1 and R2 are H, F, or CH$_3$;
R3 is

or

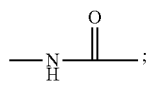

and
n is an integer from 1 to 5000.

In an embodiment, a thermosetting polyimide prepolymer is obtained by reacting a fluorine-containing maleimide compound and a thermosetting polyimide resin in the presence of a solvent. In addition, the reaction may be performed in the presence or absence of a thermal polymerization initiator. A prepolymerization reaction is performed at 60° C.-100° C. and the prepolymerization reaction is for 2-24 hours. The solvent includes: toluene, xylene, trimethylbenzene, methylcyclohexane, cyclohexane, methyl isopropyl ketone, methyl isopropyl ketone, cyclohexanone, diisobutyl ketone, methyl isobutyl ketone, acetone, 1,1,3-trimethylcyclohexenone, 2,6-dimethyl-2,5-heptadien-4-one, 2-pentanone, 3-methyl 2-pentanone, 2-methyl-3-pentanone, 3-pentanone, 4-methyl-3-penten-2-one, N-methylpyrrolidone, dimethylformamide, dimethylacetamide, or a combination of the above solvents.

An embodiment of the disclosure provides a polyimide adhesive, including the thermosetting polyimide resin as a constituent element thereof.

Another embodiment of the disclosure provides a polyimide adhesive, including the thermosetting polyimide resin composition as a constituent element thereof.

Yet another embodiment of the disclosure provides a polyimide adhesive, including the thermosetting polyimide prepolymer as a constituent element thereof.

An embodiment of the disclosure provides a polyimide film, including the thermosetting polyimide resin as a constituent element thereof.

Another embodiment of the disclosure provides a polyimide film, including the thermosetting polyimide prepolymer as a constituent element thereof.

In an embodiment, a glue prepared by the thermosetting polyimide resin or the thermosetting polyimide prepolymer may be coated on a stainless-steel plate, a glass plate, a copper foil, a polyethylene terephthalate (PET) film, or a polyimide (PI) film to form a film by drying or curing. In addition, an inorganic filler or an organic filler may be added to the glue, wherein the inorganic filler and the organic filler include: boron nitride, silicone, hollow silica, polytetrafluoroethylene (PTFE) powder, polyether ether ketone (PEEK) powder, etc.

In an embodiment, the thermosetting polyimide resin, the thermosetting polyimide resin composition, and the thermosetting polyimide prepolymer may be produced into an adhesive. A prepreg sheet is obtained after impregnating with a glass fiber cloth and drying, and then a substrate is obtained after being pressed with the copper foil.

An embodiment of the disclosure provides a polyimide adhesive, for manufacturing a film, an adhesive sheet, a cover film, a redistribution layer, a build-up board, a prepreg sheet, a high-frequency substrate, an IC carrier board, an adhesive for copper foil, a semiconductor packaging material, a radome, a substrate for server, a substrate for base station, or a substrate for vehicle.

An embodiment of the disclosure provides a thermosetting polyimide adhesive resin, for manufacturing a prepreg sheet, a high-frequency substrate, an IC carrier board, a build-up board, an adhesive for copper foil, a semiconductor packaging material, a radome, a substrate for server, a substrate for base station, a substrate for vehicle, etc.

Hereinafter, the disclosure will be described in detail with reference to examples. The following examples are provided to describe the disclosure. The scope of the disclosure includes the scope described in the following and the substitutions and modifications thereof, and is not limited to the scope of the examples.

Example 1

55.9 g (0.100 mole) of C36 dimer diamine (product name: PRIAMINE1074 Dimer Diamine, manufactured by Croda), 44.9 g (0.098 mole) of 9,9-Bis(3,4-dicarboxyphenyl)fluorenedianhydride (manufactured by JFE Chemical Corporation), 80 g of N-methyl-2-pyrrolidone, and 120 g of xylene are placed in a four-mouth reaction flask with mechanical stirring, condensing tube, drying tube, distillation receiver, and nitrogen. The reaction temperature is controlled at 20° C.-30° C. for 1 hour and 100° C.-120° C. for 1 hour. After heating to 150° C.-160° C. to azeotropically remove water, the solution is reacted for 3 hours. Next, after cooling to below 100° C., 0.56 g (0.004 mole) of allylsuccinic anhydride (manufactured by Tokyo Chemical Industry (TCI)) is added. Residual water is azeotropically removed by heating to 150° C. to 160° C. The solution is reacted for 2 hours, the temperature is lowered to 50° C., 200 g of pure water is added, and stirred at 50° C. for 30 minutes before standing to separate a water layer. Then, 200 g of pure water is added and the solution is stirred at 50° C. for 30 minutes before standing to separate the water layer. Washing is repeated three times. 50 g of toluene is added and the solution is heated to 90° C.-120° C. under reflux to azeotropically remove water in the resin solution. After cooling, the solid content of the solution is adjusted to 30% by toluene to obtain a thermosetting polyimide resin solution PI-FDA. The acid value and molecular weight thereof are measured. In Examples 1 to 5 and Comparative Example 1, the measurement method of the acid value is to use 0.02N of KOH as the titration and methyl red as the indicator to titrate the sample to be measured (unit is KOHmg/g). The molecular weight is measured by gel permeation chromatography (GPC).

PI-FDA

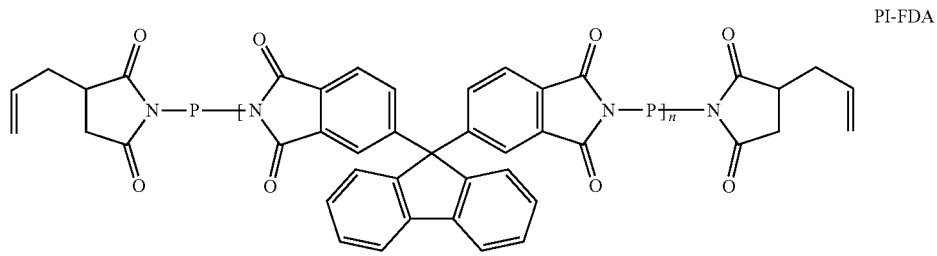

where P is a C36 divalent hydrocarbon group having an aliphatic side chain; and n is an integer from 1 to 5000.

Example 2

55.9 g (0.100 mole) of C36 dimer diamine (product name: PRIAMINE 1074 Dimer Diamine, manufactured by Croda), 68.3 g (0.098 mole) of N,N'-[4,4'-(9H-fluorene-9,9-diyl)bis(4,1-phenylene)]bis(1,3-dioxo-1,3-dihydroisobenzofuran-5-carboxamide) (manufactured by Shifeng Technology Co., Ltd.), 80 g of N-methyl-2-pyrrolidone, and 120 g of xylene are placed in a four-mouth reaction flask with mechanical stirring, condensing tube, drying tube, distillation receiver, and nitrogen. The reaction temperature is controlled at 20° C.-30° C. for 1 hour and 100° C.-120° C. for 1 hour. After heating to 140° C.-160° C. to azeotropically remove water, the solution is reacted for 3 hours. Next, after cooling to below 100° C., 0.56 g (0.004 mole) of allylsuccinic anhydride (manufactured by TCI) is added. Residual water is azeotropically removed by heating to 140° C. to 160° C. The solution is reacted for 2 hours, the temperature is lowered to 50° C., 200 g of pure water is added, and stirred at 50° C. for 30 minutes before standing to separate a water layer. Then, 200 g of pure water is added and the solution is stirred at 50° C. for 30 minutes before standing to separate the water layer. Washing is repeated three times. 50 g of toluene is added and the solution is heated to 90° C.-120° C. under reflux to azeotropically remove water in the resin solution and heated to 100° C.-120° C. to dehydrate. After cooling, the solid content of the solution is adjusted to 30% by toluene to obtain a thermosetting polyimide resin solution PI-ATA. The acid value thereof is measured and the molecular weight thereof is measured by GPC.

PI-ATA

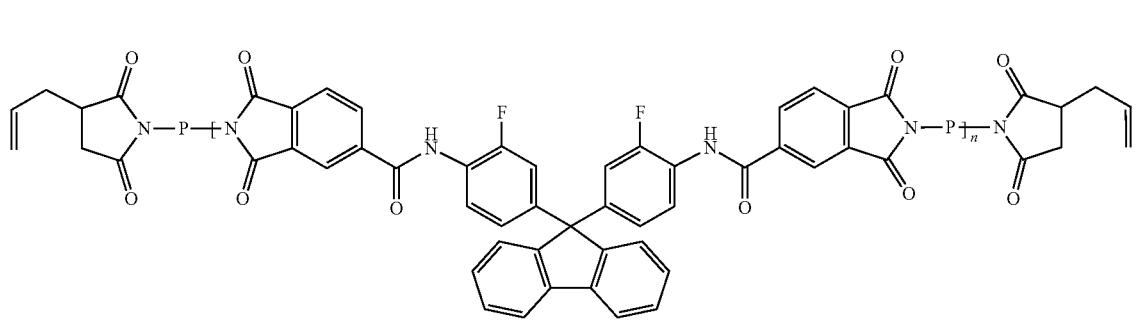

where P is a C36 divalent hydrocarbon group having an aliphatic side chain; and n is an integer from 1 to 5000.

Example 3

55.9 g (0.100 mole) of C36 dimer diamine (product name: PRIAMINE 1074 Dimer Diamine, manufactured by Croda), 63.0 g (0.098 mole) of 9,9-Bis[4-(3,4-dicarboxyphenoxy)phenyl]fluorene dianhydride (manufactured by JFE Chemical Corporation), 80 g of N-methyl-2-pyrrolidone, 120 g of xylene are placed in a four-mouth reaction flask with mechanical stirring, condensing tube, drying tube, distillation receiver, and nitrogen. The reaction temperature is controlled at 20° C.-30° C. for 1 hour and 100° C.-120° C. for 1 hour. After heating to 140° C.-160° C. to azeotropically remove water, the solution is reacted for 3 hours. Next, after cooling to below 100° C., 0.56 g (0.004 mole) of allylsuccinic anhydride (manufactured by TCI) is added. Residual water is azeotropically removed by heating to 140° C. to 160° C. The solution is reacted for 2 hours, the temperature is lowered to 50° C., 200 g of pure water is added, and stirred at 50° C. for 30 minutes before standing to separate a water layer. Then, 200 g of pure water is added and the solution is stirred at 50° C. for 30 minutes before standing to separate the water layer. Washing is repeated three times. 50 g of toluene is added and the solution is heated to 90° C.-120° C. under reflux to azeotropically remove water in the resin solution and heated to 100° C.-120° C. to dehydrate. After cooling, the solid content of the solution is adjusted to 30% by toluene to obtain a thermosetting polyimide resin solution PI-PA. The acid value thereof is measured and the molecular weight thereof is measured by GPC.

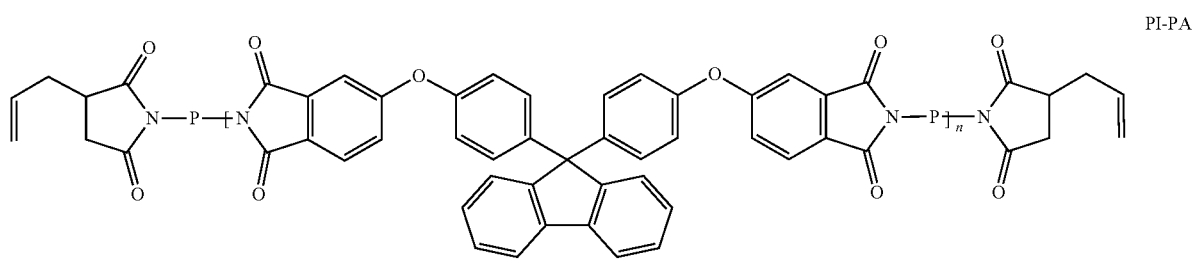

PI-PA where P is a C36 divalent hydrocarbon group having an aliphatic side chain; and n is an integer from 1 to 5000.

Example 4

55.9 g (0.100 mole) of C36 dimer diamine (product name: PRIAMINE 1074 Dimer Diamine, manufactured by Croda), 63.0 g (0.098 mole) of 9,9-bis[4-(3,4-dicarboxyphenyl)phenoxy]fluorene dianhydride (manufactured by Shifeng Technology Co., Ltd.), 80 g of N-methyl-2-pyrrolidone, and 120 g of xylene are placed in a four-mouth reaction flask with mechanical stirring, condensing tube, drying tube, distillation receiver, and nitrogen. The reaction temperature is controlled at 20° C.-30° C. for 1 hour and 100° C.-120° C. for 1 hour. After heating to 140° C.-160° C. to azeotropically remove water, the solution is reacted for 3 hours. Next, after cooling to below 100° C., 0.56 g (0.004 mole) of allylsuccinic anhydride (manufactured by TCI) is added. Residual water is azeotropically removed by heating to 140° C. to 160° C. The solution is reacted for 2 hours, the temperature is lowered to 50° C., 200 g of pure water is added, and stirred at 50° C. for 30 minutes before standing to separate a water layer. Then, 200 g of pure water is added and the solution is stirred at 50° C. for 30 minutes before standing to separate the water layer. Washing is repeated three times. 50 g of toluene is added and the solution is heated to 90° C.-120° C. under reflux to azeotropically remove water in the resin solution and heated to 100° C.-120° C. to dehydrate. After cooling, the solid content of the solution is adjusted to 30% by toluene to obtain a thermosetting polyimide resin PI-2 solution PI-EA. The acid value thereof is measured and the molecular weight thereof is measured by GPC.

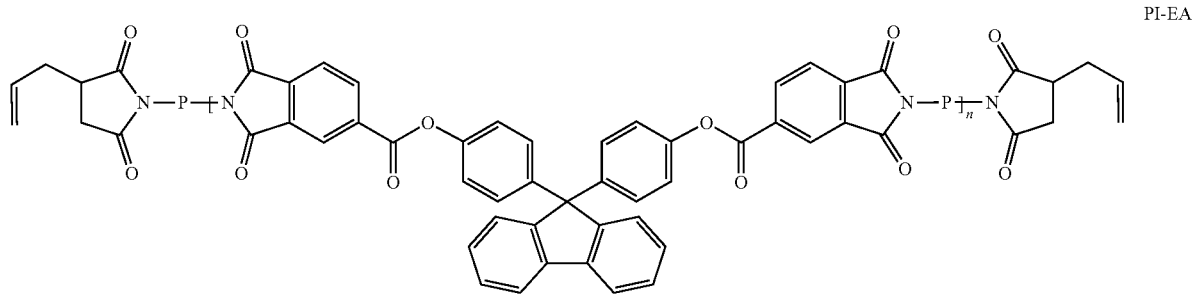

PI-EA where P is a C36 divalent hydrocarbon group having an aliphatic side chain; and n is an integer from 1 to 5000.

Example 5

55.9 g (0.100 mole) of C36 dimer diamine (product name: PRIAMINE 1074 Dimer Diamine, manufactured by Croda), 70.8 g (0.098 mole) of 9,9-bis[4-(3,4-dicarboxyphenoxy) tolyl]fluorene dianhydride (manufactured by Shifeng Technology Co., Ltd.), 80 g of N-methyl-2-pyrrolidone, 120 g of xylene are placed in a four-mouth reaction flask with mechanical stirring, condensing tube, drying tube, distillation receiver, and nitrogen. The reaction temperature is controlled at 20° C.-30° C. for 1 hour and 100° C.-120° C. for 1 hour. After heating to 140° C.-160° C. to azeotropically remove water, the solution is reacted for 3 hours. Next, after cooling to below 100° C., 0.56 g (0.004 mole) of allylsuccinic anhydride (manufactured by TCI) is added. Residual water is azeotropically removed by heating to 140° C. to 160° C. The solution is reacted for 2 hours, the temperature is lowered to 50° C., 200 g of pure water is added, and stirred at 50° C. for 30 minutes before standing to separate a water layer. Then, 200 g of pure water is added and the solution is stirred at 50° C. for 30 minutes before standing to separate the water layer. Washing is repeated three times. 50 g of toluene is added and the solution is heated to 90° C.-120° C. under reflux to azeotropically remove water in the resin solution and heated to 100° C.-120° C. to dehydrate. After cooling, the solid content of the solution is adjusted to 30% by toluene to obtain a thermosetting polyimide resin solution PI-MEA. The acid value thereof is measured and the molecular weight thereof is measured by GPC.

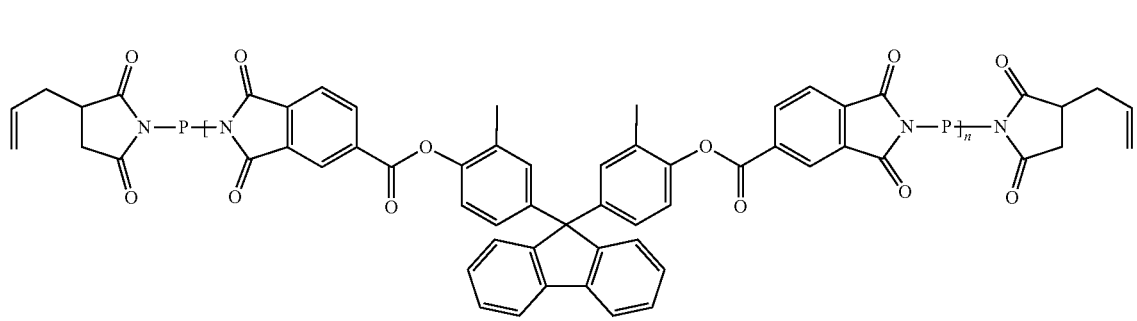

PI-MEA where P is a C36 divalent hydrocarbon group having an aliphatic side chain; and n is an integer from 1 to 5000.

Comparative Example 1

54.8 g (0.098 mole) of fatty amine dimer, 29.4 g (0.10 mole) of biphenyltetracarboxylic dianhydride, 20 g of dimethylacetamide, and 200 g of diisobutyl ketone are placed in a four-mouth reaction flask with mechanical stirring, condensing tube, drying tube, distillation receiver, and nitrogen. The reaction temperature is controlled at 20° C.-30° C. for 1 hour. After heating to 125° C.-135° C. to azeotropically remove water, the solution is reacted for 3 hours. Residual water is azeotropically removed by heating to 160° C. to 180° C. The temperature is lowered to 100° C. The solid content of the solution is adjusted to 30% by toluene to obtain a thermosetting polyimide resin PI-BP solution. The acid value thereof is measured and the molecular weight thereof is measured by GPC.

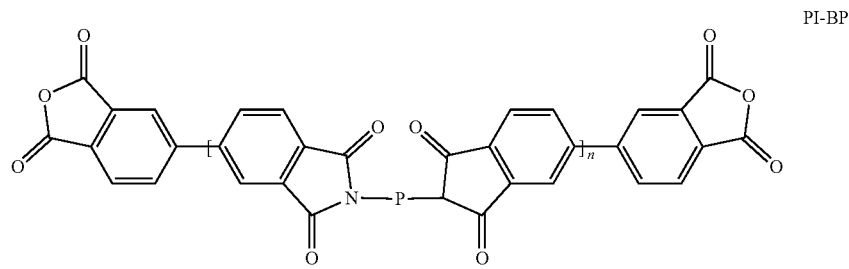

PI-BP where P is a C36 divalent hydrocarbon group having an aliphatic side chain; and n is an integer from 1 to 5000.

TABLE 1

|  | Example 1 | Example 2 | Example 3 | Example 4 | Example 5 | Comparative Example 1 |
|---|---|---|---|---|---|---|
| Resin | PI-FDA | PI-ATA | PI-PA | PI-EA | PI-MEA | PI-BP |
| Mw | 30647 | 28722 | 33542 | 32557 | 34321 | 33216 |
| Mn | 6423 | 6140 | 6701 | 6576 | 6637 | 6678 |
| Acid Value | 0.001 | 0.001 | 0.001 | 0.001 | 0.001 | 1.322 |

Mw is weight average molecular weight; and Mn is number average molecular weight.

Examples 6-10

100 g solution of each of the resins PI-FDA, PI-ATA, PI-PA, PI-EA, and PI-MEA is sequentially mixed, and 0.05 g of dicumyl peroxide is added to produce a glue after being well mixed. The solution is dried at 120° C. for 2 hours, at 160° C. for 2 hours, at 180° C. for 2 hours, and at 200° C. for 2 hours, and finally baked at 250° C. for 2 hours to produce a cured product with a film thickness of 1.0 mm. Tg, elastic modulus, thermal decomposition temperature, dielectric constant (Dk), and dissipation factor (DO thereof are measured. The glue is coated on a heat-resistant glass plate to be dried at 120° C. for 2 hours, at 160° C. for 2 hours, at 180° C. for 2 hours, and at 200° C. for 2 hours, and finally baked at 250° C. for 3 hours to obtain a cured product with a film thickness of 0.2 mm. The solvent resistance, film formation, and water absorption rate thereof are measured, and the data thereof are as shown in Table 2.

Comparative Example 2

100 g solution of the PI-BP resin of Comparative Example 1 is dried at 120° C. for 2 hours, at 160° C. for 2 hours, at 180° C. for 2 hours, and at 200° C. for 2 hours, and finally baked at 250° C. for 3 hours to form a cured product with a film thickness of 1.0 mm. Tg, elastic modulus, thermal decomposition temperature, Dk, and Df thereof are measured. The glue is coated on a heat-resistant glass plate to be dried at 120° C. for 2 hours, at 160° C. for 2 hours, at 180° C. for 2 hours, and at 200° C. for 2 hours, and finally baked at 250° C. for 3 hours to obtain a cured product with a film thickness of 0.2 mm. The solvent resistance, film formation, and water absorption rate thereof are measured, and the data thereof are as shown in Table 2.

Comparative Example 3

30 g of commercially available C36 diamine dimer bismaleimide (product name: BMI-689, manufactured by Designer Molecules Inc.) is added to 70 g of toluene and 0.05 g of dicumyl peroxide to produce a glue after being well mixed. The solution is dried at 120° C. for 2 hours, at 160° C. for 2 hours, at 180° C. for 2 hours, and at 200° C. for 2 hours, and finally baked at 250° C. for 2 hours to produce a cured product with a film thickness of 1.0 mm. Tg, elastic modulus, thermal decomposition temperature ($Td_5$), Dk, and Df thereof are measured. The glue is coated on a heat-resistant glass plate to be dried at 120° C. for 2 hours, at 160°

C. for 2 hours, at 180° C. for 2 hours, and at 200° C. for 2 hours, and finally baked at 250° C. for 3 hours to obtain a cured product with a film thickness of 0.2 mm. The solvent resistance, film formation, and water absorption rate thereof are measured, and the data thereof are as shown in Table 2.

TABLE 2

|  | Example 6 | Example 7 | Example 8 | Example 9 | Example 10 | Comparative Example 2 | Comparative Example 3 |
|---|---|---|---|---|---|---|---|
| Resin | PI-FDA | PI-ATA | PI-PA | PI-EA | PI-MEA | PI-BP | BMI-689 |
| Tg/° C. | 154 | 210 | 144 | 206 | 202 | 46 | 61 |
| Elastic modulus/GPa | 1.25 | 1.30 | 1.05 | 1.56 | 1.60 | 0.42 | 0.70 |
| Td5/° C. | 430 | 419 | 439 | 443 | 440 | 429 | 411 |
| Dk(5 GHZ) | 2.44 | 2.58 | 2.55 | 2.36 | 2.34 | 2.30 | 2.29 |
| Df(5 GHz) | 0.0024 | 0.0026 | 0.0019 | 0.0020 | 0.0016 | 0.0033 | 0.0036 |
| Water Absorption Rate/% | 0.15 | 0.32 | 0.23 | 0.16 | 0.13 | 0.37 | 0.39 |
| Solvent Resistance | ○ | ○ | ○ | ○ | ○ | X | ○ |
| Film Formation | ○ | ○ | ○ | ○ | ○ | ○ | X |

Examples 11-15

100 parts by weight of each of the resins PI-FDA, PI-ATA, PI-PA, PI-EA, and PI-MEA are sequentially taken, 10 parts by weight of a fluorine-containing maleimide compound, 30 parts by weight of diisobutyl ketone, and 0.03 parts by weight of dicumyl peroxide are placed in a four-mouth reaction flask with mechanical stirring, condensing tube, drying tube, distillation receiver, and nitrogen. The reaction temperature is controlled at 80° C.-90° C. for 3 hours to prepare a prepolymer. A 2116 glass fiber cloth is impregnated with a glue and dried at 175° C. for 2-15 minutes to make a semi-cured sheet in a semi-cured state. Then, four semi-cured sheets are laminated with a piece of 0.5 ounce copper foil on each of top and bottom sides, which is then hot pressed under the conditions of a temperature increase rate of 1° C.-3° C./min to 230° C. and at a pressure of 8-15 kg/cm² for 180 minutes at this temperature to obtain a substrate. Tg, elastic modulus, Dk, Df, and peel strength thereof are measured, and the data thereof are as shown in Table 3.

The fluorine-containing maleimide compounds in Table 3 are as follows:

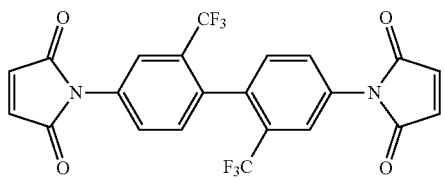 [SMILES: O=C1C=CC(=O)N1c1ccc(-c2ccc(N3C(=O)C=CC3=O)cc2C(F)(F)F)c(C(F)(F)F)c1]

(B-TFMB, manufactured by Chinyee Chemical Co., Ltd.)

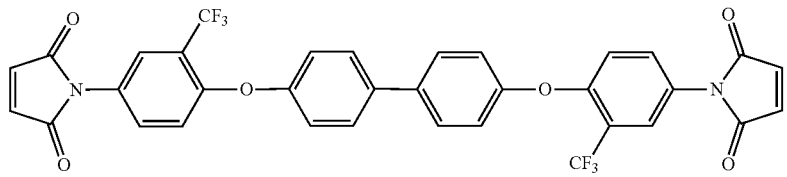 [SMILES: O=C1C=CC(=O)N1c1ccc(Oc2ccc(-c3ccc(Oc4ccc(N5C(=O)C=CC5=O)cc4C(F)(F)F)cc3)cc2)c(C(F)(F)F)c1]

(B-TPBP, manufactured by Chinyee Chemical Co., Ltd.)

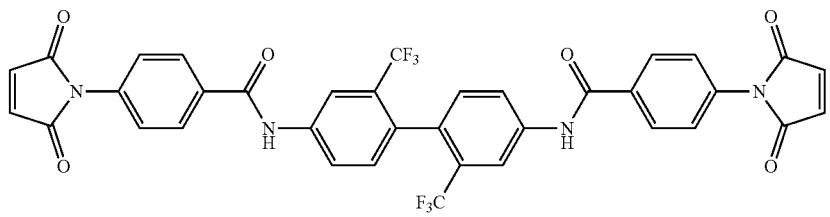 [SMILES: O=C(Nc1ccc(-c2ccc(NC(=O)c3ccc(N4C(=O)C=CC4=O)cc3)cc2C(F)(F)F)c(C(F)(F)F)c1)c1ccc(N2C(=O)C=CC2=O)cc1]

(B-BAPH, manufactured by Chinyee Chemical Co., Ltd.)

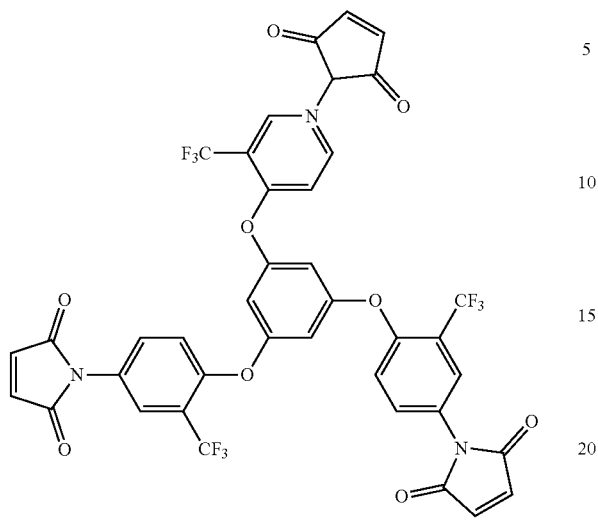

(T-TFBB, manufactured by Chinyee Chemical Co., Ltd.)

Comparative Example 4

8.0 parts by weight of N,N'-tetraglycidyl diaminodiphenylmethane (TGDDM) and 0.03 parts by weight of triphenylphosphine (TPP) are added to 100 parts by weight of a PI-BP resin to prepare a glue after being well mixed. A 2116 glass fiber cloth is impregnated with the glue and dried at 175° C. for 2-15 minutes to make a semi-cured sheet in a semi-cured state. Then, four semi-cured sheets are laminated with a piece of 0.5 ounce copper foil on each of top and bottom sides, which is then hot pressed under the conditions of a temperature increase rate of 1° C.-3° C./min to 230° C. and at a pressure of 8-15 kg/cm² for 180 minutes at this temperature, so as to obtain a substrate. Tg, Dk, Df, peel strength, elastic modulus thereof are measured, and the data thereof are as shown in Table 3.

TABLE 3

| Content/parts by weight | | Example 11 | Example 12 | Example 13 | Example 14 | Example 15 | Comparative Example 4 |
|---|---|---|---|---|---|---|---|
| Resin | PI-FDA | 100 | — | — | — | — | — |
| | PI-ATA | — | 100 | — | — | — | — |
| | PI-PA | — | — | 100 | — | — | — |
| | PI-EA | — | — | — | 100 | — | — |
| | PI-MEA | — | — | — | — | 100 | — |
| | PI-BP | — | — | — | — | — | 100 |
| Fluorine-containing Maleimide Compound | B-TFMB | 10 | — | — | 10 | — | — |
| | B-TFPH | — | 10 | — | — | — | — |
| | B-TBBP | — | — | 10 | — | — | — |
| | T-TFBB | — | — | — | — | 10 | — |
| | DCP | 0.03 | 0.03 | 0.03 | 0.03 | 0.03 | — |
| | TGDDM | — | — | — | — | — | 8 |
| | TPP | — | — | — | — | — | 0.03 |
| Evaluation Result | Tg/° C. | 268 | 272 | 237 | 210 | 207 | 92 |
| | Dk | 2.59 | 2.70 | 2.60 | 2.51 | 2.62 | 2.70 |
| | Df | 0.0023 | 0.0025 | 0.0020 | 0.0018 | 0.0016 | 0.0038 |
| | $Td_5$/° C. | 423 | 419 | 430 | 431 | 433 | 410 |
| | Elastic modulus/GPa | 1.80 | 1.60 | 1.75 | 1.38 | 1.70 | 1.65 |
| | Peel Strength/kg/cm | 1.5 | 1.6 | 1.5 | 1.4 | 1.5 | 1.6 |

Evaluation Methods of Table 2 and Table 3:

Tg: a maximum peak temperature is measured by a dynamic mechanical analyzer (DMA) manufactured by TA Instruments in units of ° C.

Elastic modulus: measured by the DMA manufactured by TA Instruments in units of GPa.

$Td_5$: measured by a Q500 thermogravimetric analyzer (TGA) manufactured by TA Instruments, 5% thermal weight loss of the thermal decomposition temperature is expressed in units of ° C.

Dk: measured by a resonant cavity manufactured by Agilent Technologies at a frequency of 5 GHz/5 GHz.

Df: measured by the resonant cavity manufactured by Agilent Technologies at a frequency of 5 GHz/5 GHz.

Water absorption rate: according to an IPC-TM-650 2.6.2.1 method, a 50.8 mm×50.8 mm film is dried at 120° C. for one hour before being immersed in distilled water at 23° C. for 24 hours. Surface moisture is wiped off to measure the weight increase of the film expressed as a percentage.

Peel strength: the adhesion of the copper foil layer to the laminate plate. The force required to peel a ⅛-inch-wide copper foil vertically from the plate surface in units of kg/cm.

Film formation: the glue is applied to the glass plate before the appearance thereof is inspected after drying and curing.

◯: indicates that the surface is flat;
Δ: indicates that the surface is rough and uneven;
X: indicates that the film is cracked.

Solvent resistance: the film is immersed in methyl ethyl ketone (MEK) for 1 hour before the appearance thereof is inspected.

◯: indicates no change;
Δ: indicates that there is expansion;
X: indicates that there is cracking and dissolution.

It can be seen from Table 2 that Df of the thermosetting polyimide resins PI-FDA, PI-ATA, PI-PA, PI-EA, and PI-MEA of Examples 1 to 5 after curing is below 0.0026, which is better than Df of PI-BP (which is 0.0033) and Df of BMI-689 (which is 0.0036). In addition, Tg of the thermosetting polyimide resins PI-FDA, PI-ATA, PI-PA, PI-EA, and PI-MEA of Examples 1 to 5 is above 144° C., which is better than Tg of PI-BP (which is 46° C.) and Tg of BMI-689 (which is 61° C.). The water absorption rate of the thermosetting polyimide resins PI-FDA, PI-ATA, PI-PA, PI-EA, and PI-MEA of Examples 1 to 5 is less than 0.32%, which is better than the water absorption rate of PI-BP (which is 0.37%) and the water absorption rate of BMI-689 (which is 0.39%). Furthermore, $Td_5$ of the thermosetting polyimide resins PI-FDA, PI-ATA, PI-PA, PI-EA, and PI-MEA of Examples 1 to 5 after curing is above 419° C., which is higher than $Td_5$ of BMI-689 (which is 411° C.). In addition, the elastic modulus of the thermosetting polyimide resins PI-FDA, PI-ATA, PI-PA, PI-EA, and PI-MEA of Examples 1 to 5 after curing is above 1.05, which is higher than the elastic modulus of PI-BP (which is 0.42) and the elastic modulus of BMI-689 (which is 0.70). In addition, the thermosetting polyimide resins PI-BP, PI-FDA, PI-ATA, PI-PA, PI-EA, and PI-MEA of Examples 1 to 5 have better solvent resistance than PI-BP and better film formation than BMI-689. Therefore, the thermosetting polyimide resins of the disclosure have lower Df, higher Tg, higher water absorption rate, better solvent resistance, and better film formation than PI-BP and BMI-689 of the prior arts, so as to have better performance.

It can be seen from Table 3 that Df of the prepolymer produced from the thermosetting resin composition containing the thermosetting polyimide resins PI-FDA, PI-ATA, PI-PA, PI-EA, and PI-MEA of Examples 1 to 5 after curing is below 0.0025, which is better than Df of PI-BP (which is 0.0038). In addition, Tg of the prepolymer produced from the thermosetting resin composition containing the thermosetting polyimide resins PI-FDA, PI-ATA, PI-PA, PI-EA, and PI-MEA of Examples 1 to 5 is above 207° C., which is better than Tg of PI-BP (which is 92° C.). Therefore, the thermosetting resin composition and the prepolymer of the disclosure have lower Df and higher Tg than PI-BP of the prior art, so as to have better performance.

In summary, the thermosetting polyimide resins of the disclosure have low Df, high Tg, high water absorption rate, excellent solvent resistance, and excellent film formation; moreover, the thermosetting resin composition and the prepolymer of the disclosure have low Df and Tg, so as to have better performance. Therefore, the disclosure can meet the requirements of the next-generation low-dielectric insulation materials with low Df and high Tg.

The disclosure has been described in conjunction with the specific embodiments and comparative examples above. Persons skilled in the art to which the disclosure belongs can make various changes based on the above descriptions without limiting the scope of the disclosure.

What is claimed is:

1. A thermosetting polyimide resin, with a chemical structure thereof shown in Formula (1):

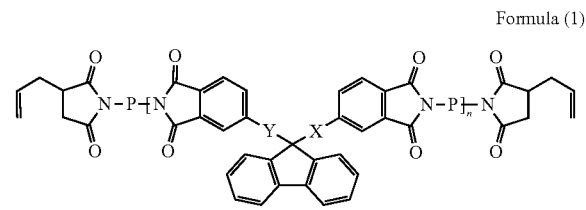

Formula (1)

where P is a C36 divalent hydrocarbon group having an aliphatic side chain;

X and Y are

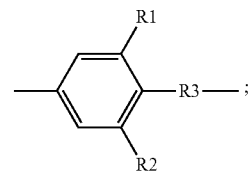

R1 and R2 are F or $CH_3$;
R3 is

or

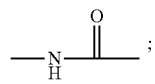

and
n is an integer from 1 to 5000.

2. A polyimide film, comprising the thermosetting polyimide resin of claim 1 as a constituent element thereof.

3. A polyimide adhesive, comprising the thermosetting polyimide resin of claim 1 as a constituent element thereof.

4. A manufacturing method of a thermosetting polyimide resin, wherein a chemical structure of the thermosetting polyimide resin is shown in Formula (1):

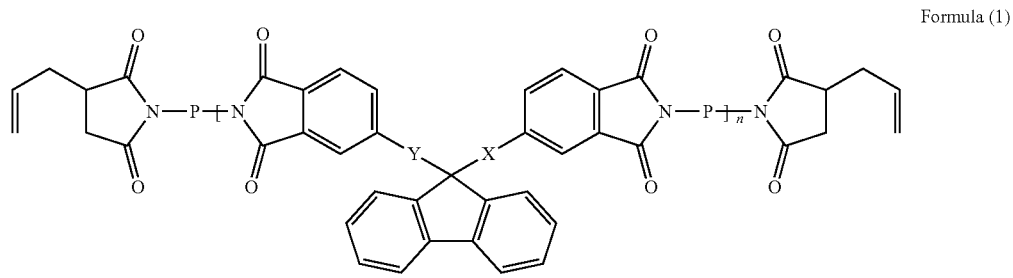

Formula (1)

where P is a C36 divalent hydrocarbon group having an aliphatic side chain;

X and Y are

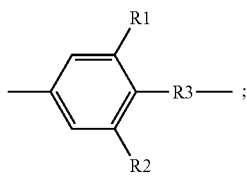

R1 and R2 are F or CH$_3$;

R3 is

or

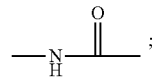

and n is an integer from 1 to 5000;

the manufacturing method of the thermosetting polyimide resin comprising:
- a procedure A of performing a dehydration reaction on C36 dimer diamine and fluorene dianhydride in a mixed solvent of a polar solvent and a low-polarity solvent to obtain a first solution containing an amine-terminated polyimide resin;
- a procedure B of adding allylsuccinic anhydride to the first solution to perform the dehydration reaction on the allylsuccinic anhydride and the amine-terminated polyimide resin to obtain a second solution containing an allyl-terminated polyimide resin; and
- a procedure C of removing any unreacted material, water-soluble substance, and water from the second solution to obtain the allyl-terminated polyimide resin.

5. A thermosetting polyimide resin composition, comprising at least:
(a) a fluorine-containing maleimide compound, selected from at least one of a group composed of

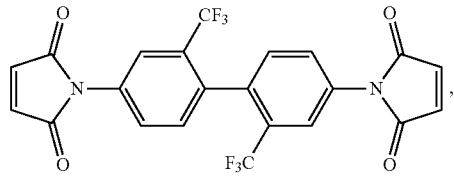

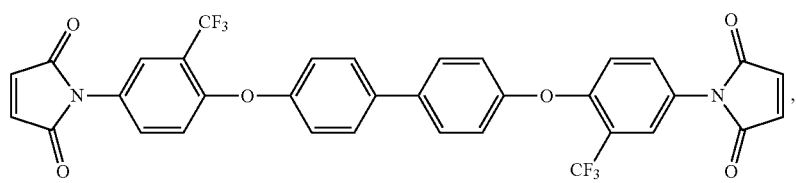

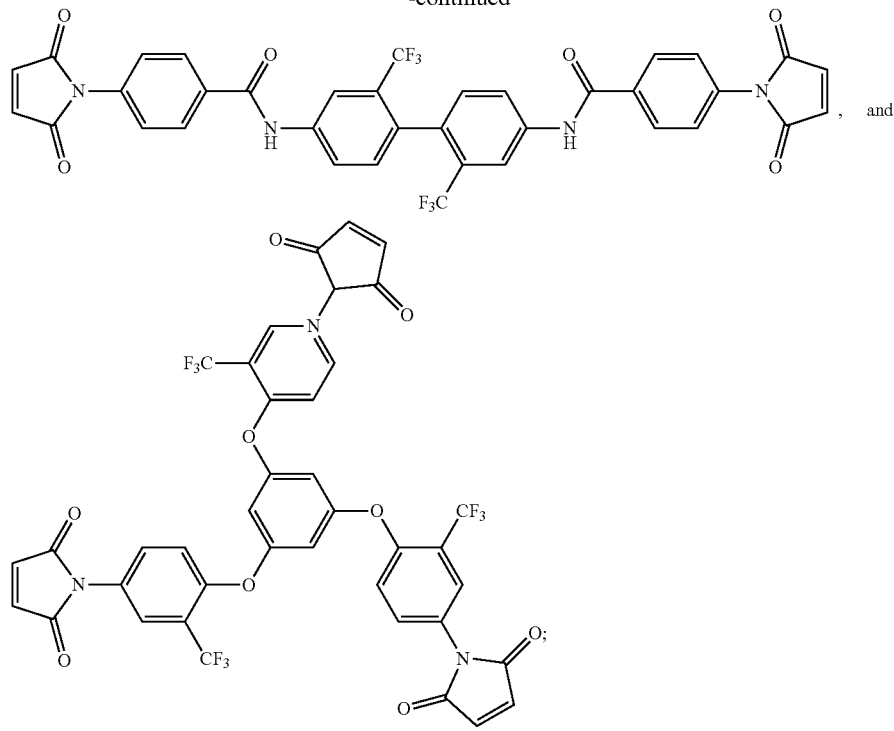
, and
and
(b) a thermosetting polyimide resin, with a chemical structure thereof shown in Formula (1):
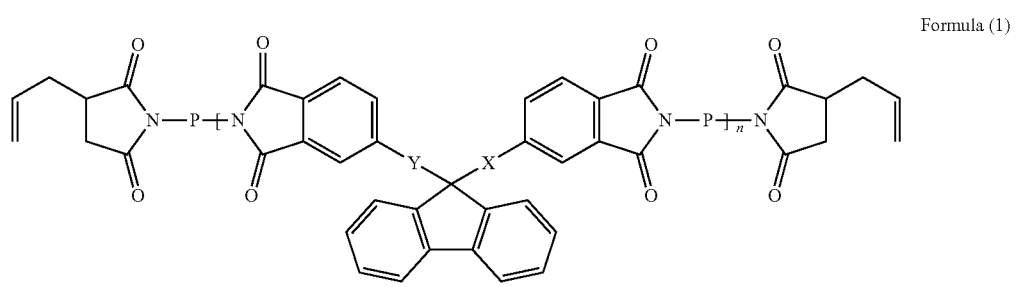
Formula (1)
where P is a C36 divalent hydrocarbon group having an aliphatic side chain;
X and Y are
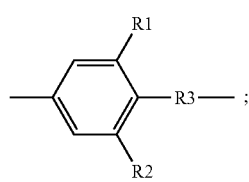
R1 and R2 are F or $CH_3$;
R3 is
or
—N(H)—C(=O)—;
and
n is an integer from 1 to 5000.

6. A polyimide adhesive, comprising the thermosetting polyimide resin composition of claim 5 as a constituent element thereof.

7. A thermosetting polyimide prepolymer, obtained by performing a prepolymerization reaction on (a) a fluorine-containing maleimide compound and (b) a thermosetting polyimide resin, wherein
(a) the fluorine-containing maleimide compound is selected from at least one of a group composed of

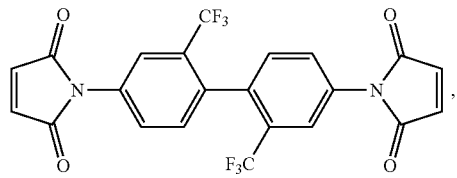

,

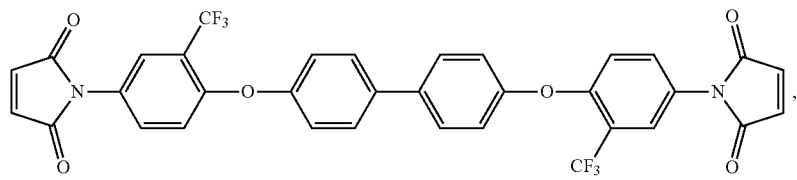

,

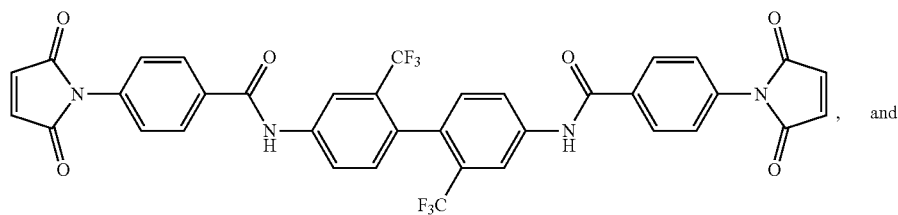

, and

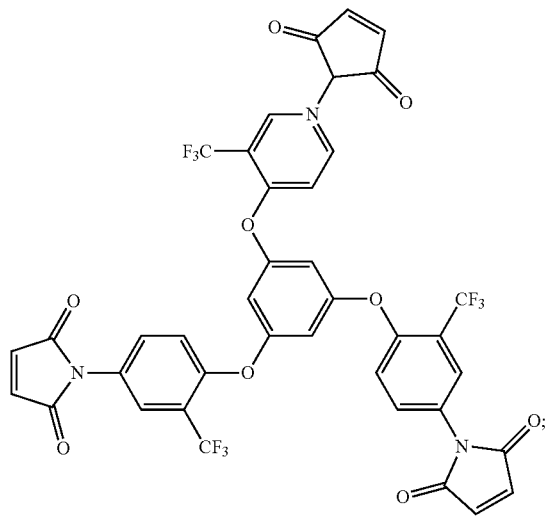

;

and (b) a chemical structure of the thermosetting polyimide resin is shown in Formula (1):

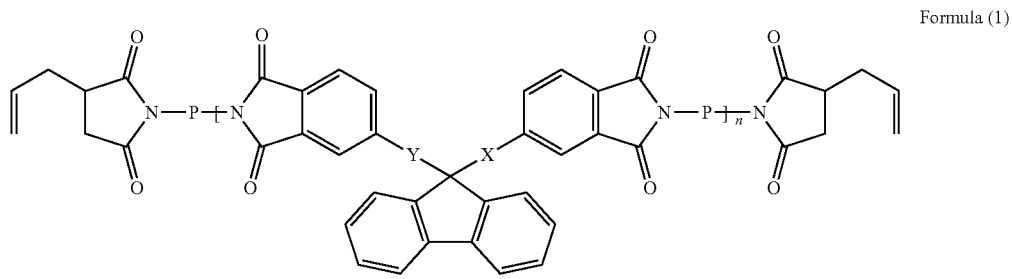

Formula (1)

where P is a C36 divalent hydrocarbon group having an aliphatic side chain;

X and Y are

or

R1 and R2 are F or $CH_3$;

R3 is

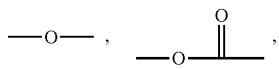

and n is an integer from 1 to 5000.

8. A polyimide film, comprising the thermosetting polyimide prepolymer of claim 7 as a constituent element thereof.

9. A polyimide adhesive, comprising the thermosetting polyimide prepolymer of claim 7 as a constituent element thereof.

\* \* \* \* \*